United States Patent
Kim et al.

(10) Patent No.: US 8,697,813 B2
(45) Date of Patent: Apr. 15, 2014

(54) REVERSIBLE FLUORESCENCE PHOTOSWITCH BASED ON DYE-CROSSLINKED DENDRITIC NANOCLUSTERS FOR HIGH-CONTRAST IMAGING OF LIVING BIOLOGICAL SYSTEMS

(75) Inventors: Yoonkyung Kim, Seoul (KR); Hye-youn Jung, Daejeon (KR); Bong Hyun Chung, Daejeon (KR)

(73) Assignee: Korea Research Institute of Bioscience and Biotechnology, Daejeon (KR)

( * ) Notice: Subject to any disclaimer, the term of this patent is extended or adjusted under 35 U.S.C. 154(b) by 77 days.

(21) Appl. No.: 13/218,608

(22) Filed: Aug. 26, 2011

(65) Prior Publication Data

US 2012/0220734 A1    Aug. 30, 2012

(30) Foreign Application Priority Data

Feb. 28, 2011 (KR) .................. 10-2011-0018123
Aug. 24, 2011 (KR) .................. 10-2011-0084771

(51) Int. Cl.
| | |
|---|---|
| C08F 283/04 | (2006.01) |
| C08G 69/48 | (2006.01) |
| C08G 73/10 | (2006.01) |
| C08L 77/00 | (2006.01) |
| C08L 79/08 | (2006.01) |
| G02B 5/23 | (2006.01) |

(52) U.S. Cl.
USPC ........... 525/422; 252/586; 977/788; 977/927; 977/930

(58) Field of Classification Search
USPC ............ 252/586; 525/422; 977/788, 927, 930
See application file for complete search history.

(56) References Cited

U.S. PATENT DOCUMENTS 4,410,688 A    10/1983    Denkewalter

FOREIGN PATENT DOCUMENTS

JP    2003-246776 A    9/2003

OTHER PUBLICATIONS

Yoonkyung Kim, Hye-youn Jung, Chaewoon Lee, Sung-Kyun Ko, Yohan Choi, Injae Shin, Eunkyoung Kim, and Bong Hyun Chung, Reversible Internal Light Switch for Living Vertebrates From Dye-Crosslinked Dendritic Nanoclusters, Society, Division of Polymer Chemistry, 52(1), No pp. given, Mar. 27-31, 2011, ACS National Meeting.*

(Continued)

*Primary Examiner* — Bijan Ahvazi
(74) *Attorney, Agent, or Firm* — Lucas & Mercanti, LLP

(57) ABSTRACT

The present invention relates to a reversible fluorescence photoswitch based on the dye-crosslinked dendritic nanoclusters for high-contrast imaging of living biological systems. The dendritic nanocluster according to the present invention consists of two or more dendrimers crosslinked each other to have a globular shape overall, and thereby enhancing the fluorescence intensity and improving the detection sensitivity of the monomeric dendrimers. In addition, the dendritic nanocluster according to the present invention was found to internalize into a living zebrafish by both skin permeation and microinjection, independently. Further, the dendritic nanocluster according to the present invention showed low toxicity and thus it could be useful for both in vivo and in vitro imaging as well as the ex vivo cell tracking applications.

14 Claims, 23 Drawing Sheets
(21 of 23 Drawing Sheet(s) Filed in Color)

(56) References Cited

OTHER PUBLICATIONS

Yoonkyung Kim, Hye-youn Jung, Chaewoon Lee, Bong Hyun Chung, Reversible Light Switch for Biological Systems by Photochromic FRET from Dye-Crosslinked Dendritic Nanoclusters, 2010 World Molecular Imaging Congress, Sep. 8-11, 2010, Kyoto, Japan, Poster Session 4c, Sep. 11, 2010 / 15:15-16:45 / Room: E.*

Irie, "Diarylethenes for memories and switches", Chemical Reviews, 2000, vol. 100(5), pp. 1685-1716.

Nakamura, et al., "Theoretical investigation on photochromic diarylethene: A short review", Journal of Photochemistry and Photobiology A: Chemistry, 2008, vol. 200, pp. 10-18.

Hirose, et al., "Self-assembly of photochromic diarylethenes with amphiphilic side chains: Reversible thermal and photochemical control", J. of Org. Chem., 2006, vol. 71(20), pp. 7499-7508.

Irie, et al. "A digital fluorescent molecular photoswitch: The signal from a gaudy ring molecule flashes on and off as light flicks it open and shut", Nature, 2002, vol. 420, pp. 759-760.

Giordano, et al., "Diheteroarylethenes as thermally stable photoswitchable acceptors in photochromic fluorescence resonace energy transfer (pcFRET)", J. Am. Chem. Soc., 2002, vol. 124, pp. 7481-7489.

Soh, et al., "A fluorescent photochromic compound for labeling biomolecules", Chem. Commun., 2007, pp. 5206-5208.

Zou, et al., "Amphilic diarylethene as a photoswitchable probe for imagining living cells", J. Am. Chem. Soc., 2008, vol. 130, pp. 15750-15751.

Al-Atar, et al., "A photocontrolled molecular switch regulates paralysis in a living organism", J. Am. Chem. Soc., 2009, vol. 131, pp. 15966-15967.

Beharry, et al., "Fluorescence imaging of azobenzene photoswitching in vivo", Angew. Chem. Int. Ed., 2011, vol. 50, pp. 1325-1327.

* cited by examiner

Fig. 9
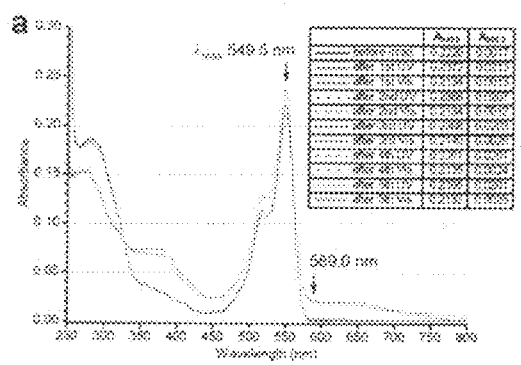
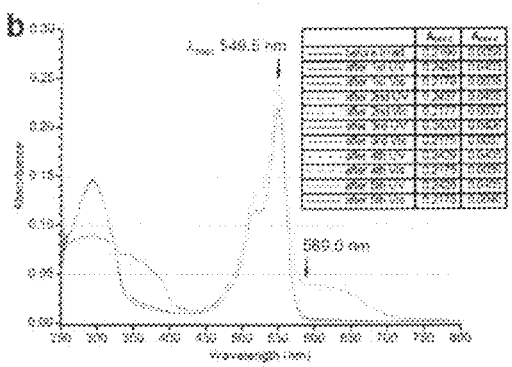
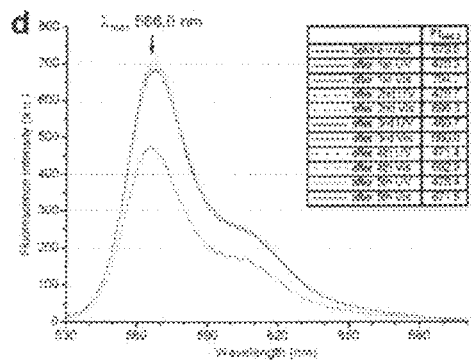

Fig. 12
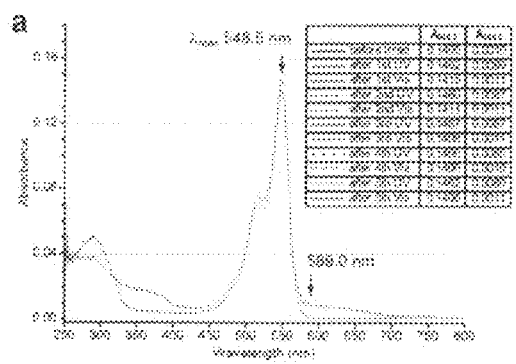
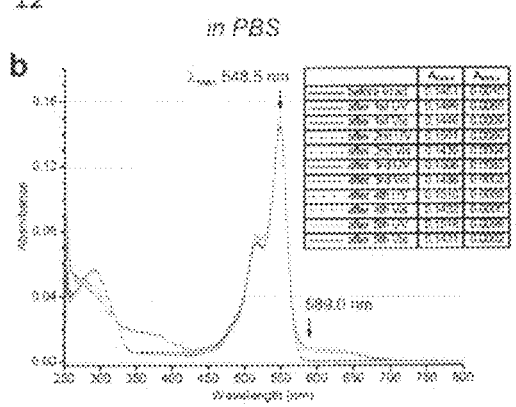
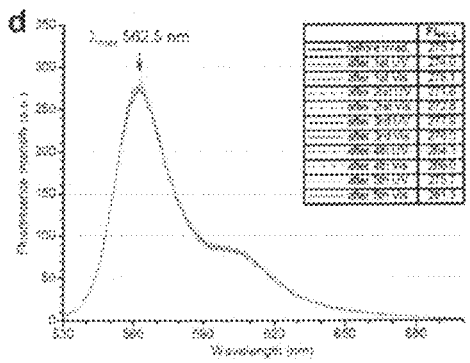

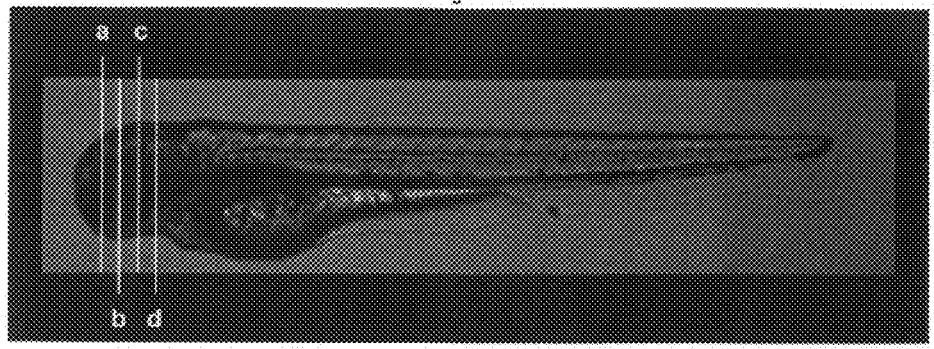
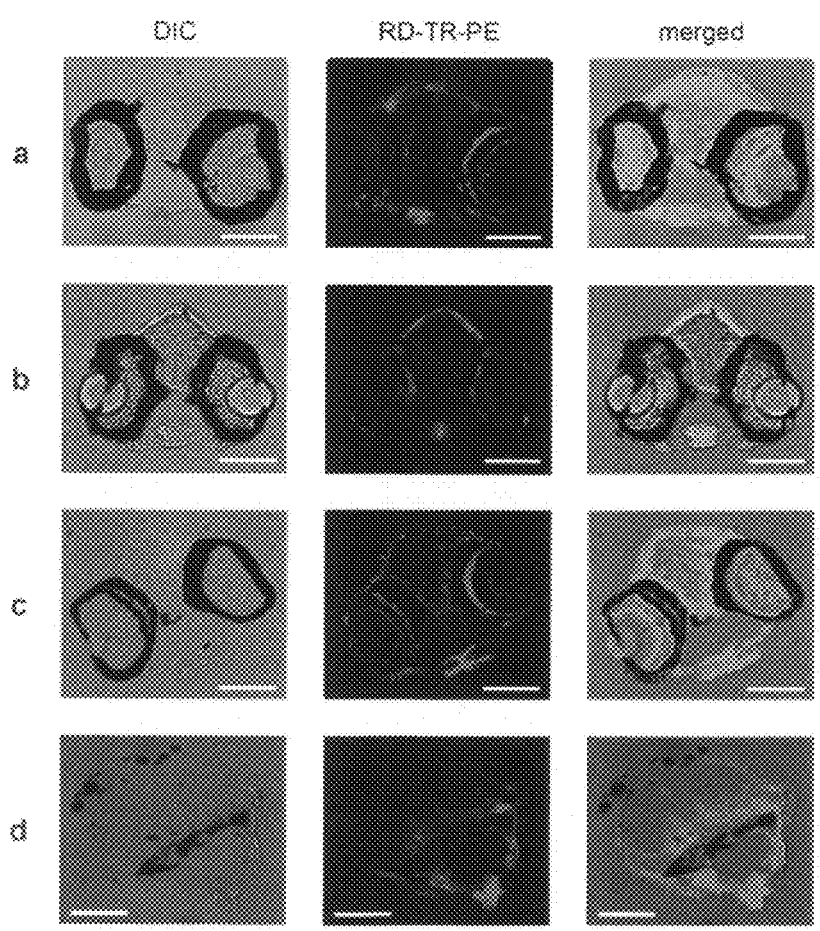
Fig. 19

[Reaction Formula 1]

Fig. 21 (con'd)
wherein,
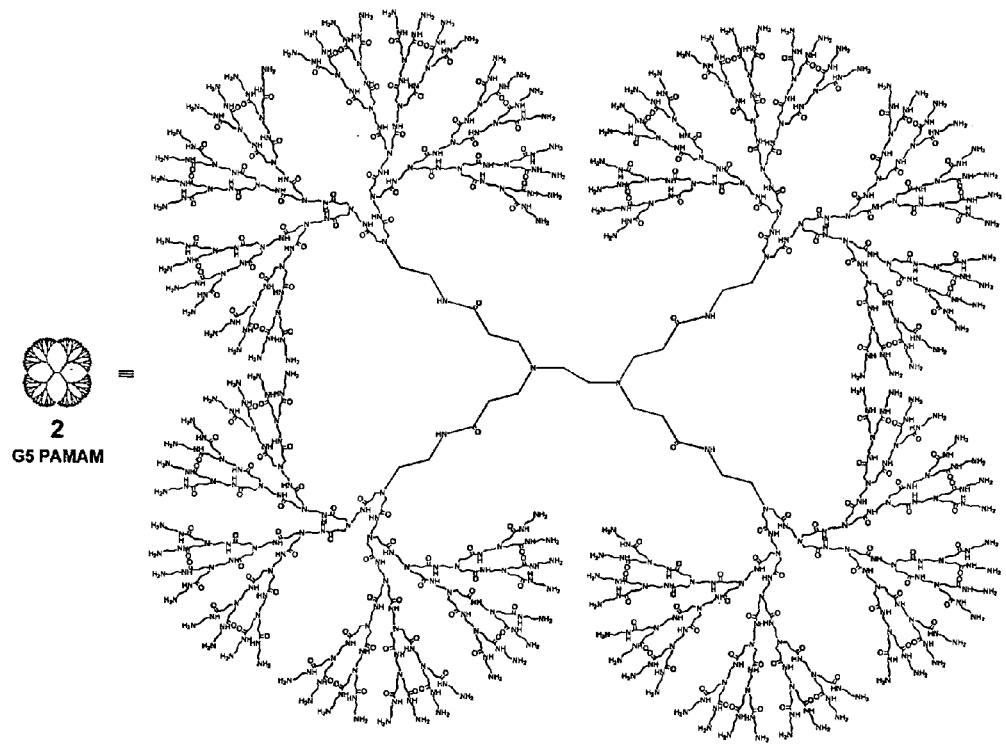

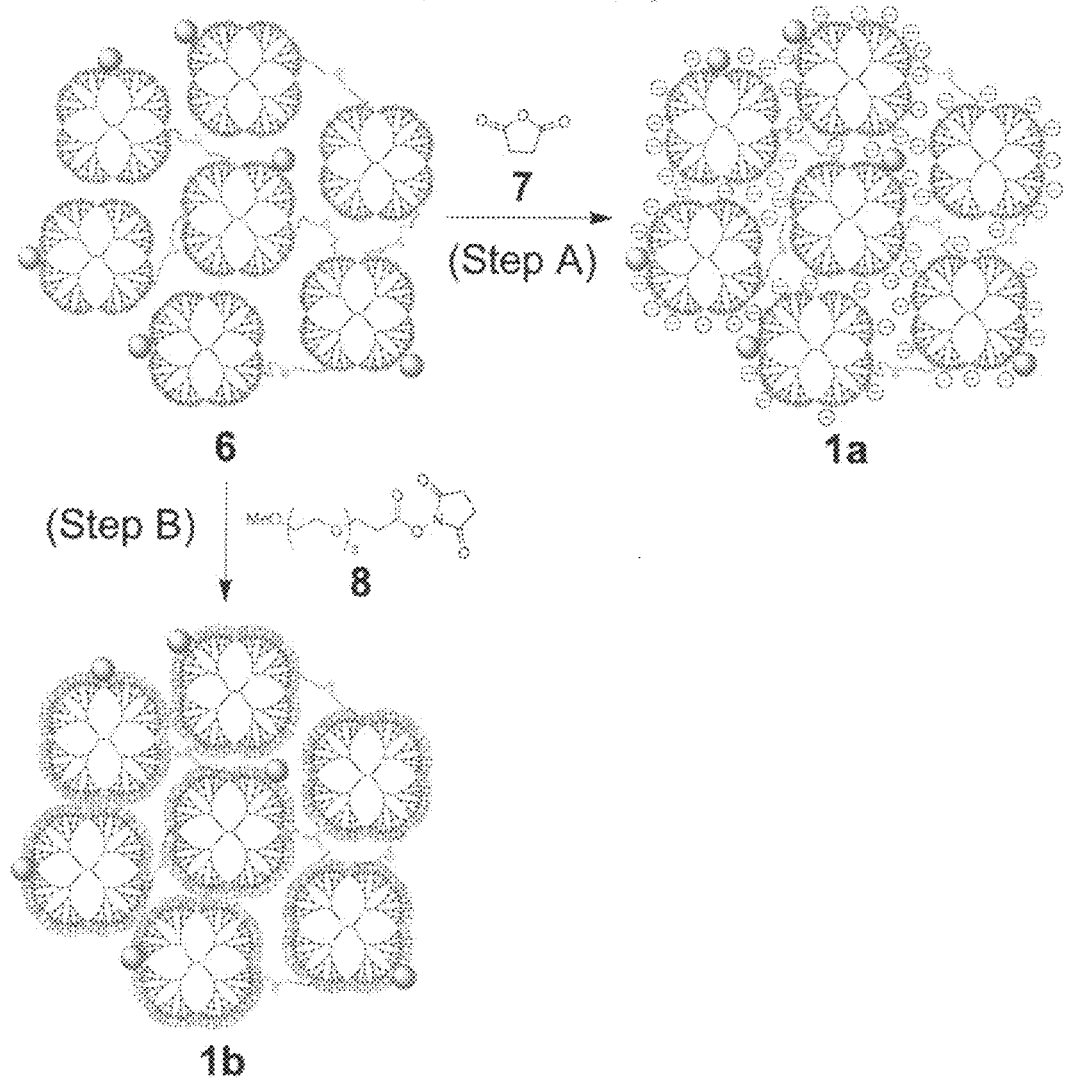

REVERSIBLE FLUORESCENCE PHOTOSWITCH BASED ON DYE-CROSSLINKED DENDRITIC NANOCLUSTERS FOR HIGH-CONTRAST IMAGING OF LIVING BIOLOGICAL SYSTEMS

CROSS-REFERENCES TO RELATED APPLICATIONS

This patent application claims the benefit of priority under 35 U.S.C. §119 from Korean Patent Application Nos. 10-2011-0018123 filed on Feb. 28, 2011 and 10-2011-0084771 filed on Aug. 24, 2011, the contents of each of which are incorporated herein by reference.

BACKGROUND OF THE INVENTION

1. Field of the Invention

The present invention relates to a reversible fluorescence photoswitch based on the dye-crosslinked dendritic nanoclusters for high-contrast imaging of living biological systems.

2. Description of the Related Art

Since Denkewalter synthesized the polylysine dendrimer for the first time in the late 1970s, research on dendrimers has been conducted actively, which includes design of new dendrimer structures and development of efficient synthetic strategies, understanding physicochemical and structural properties of various types of dendrimers and utilization of those information in building dendrimer-based highly ordered structures (e.g., self-assembly) and biomimetic systems, and applications of dendrimers in materials sciences and biomedicine. The following is an example of the structure of polylysine dendrimer synthesized by Denkewalter [U.S. Pat. No. 4,410,688].

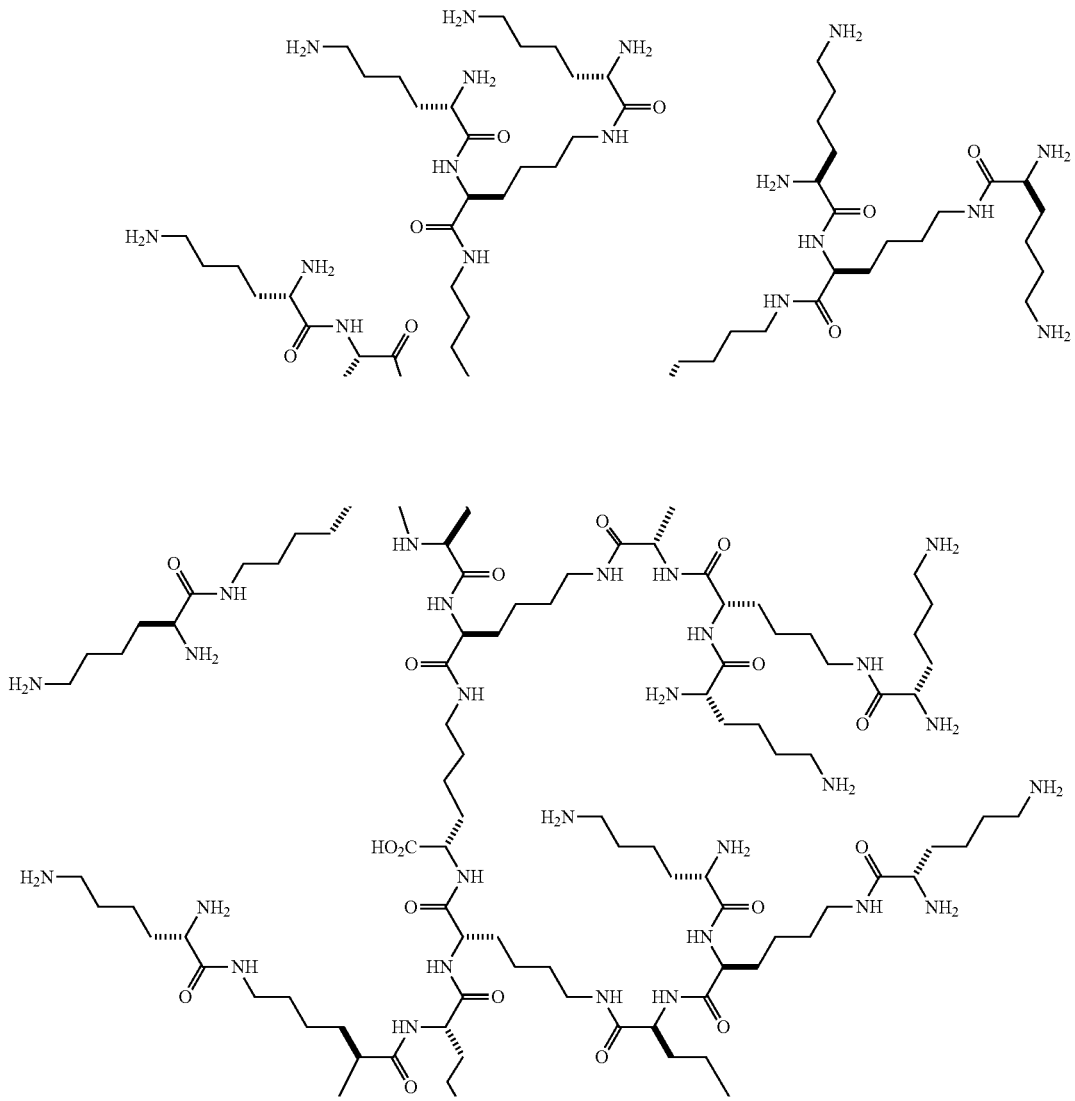

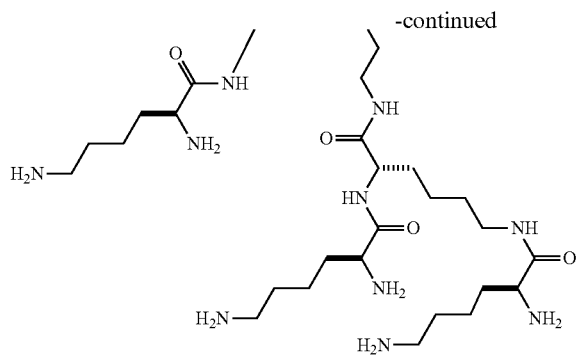
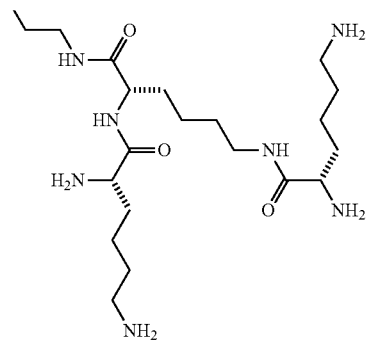

Dendrimers are relatively small (ca. <10 nm in diameter) tree-like (radial-shaped) unimolecular polymers which are made by stepwise iterative synthesis. Unlike other conventional polymers, the size of a dendrimer is somewhat predictable and robust in a specific environment (solvent, pH, temperature, etc.). Therefore, dendrimers are in a highly favorable position because they can be customized to various applications, particularly those which are sensitive to the hydrodynamic diameters. Specifically, the advantages of dendrimers include structural integrity, possibility to control the component functional groups and their corresponding physical properties by chemical synthesis, feasibility to conjugate multiple functional units (small-molecule drugs, targeting units, surface modifiers, etc.) at the periphery and the interior, and a low enzymatic degradation rate.

Applications of dendrimers in biomedical research include the usage of polycationic dendrimers to form charge complexes with negatively charged genes for efficient gene transfection, the usage of dendrimers as delivery vehicle to either physically encapsulate or covalently attach the small-molecule drugs for their controlled release at the diseased sites in response to specific stimuli (pH, light, enzyme, etc.), the structural modification of dendrimer scaffolds for targeted delivery or release of drugs at a controlled rate, the enhancement of binding affinity in the ligand-receptor interactions at the extracellular matrix through the multivalent effect, attachment of multiple copies of imaging agents at the dendrimer scaffolds to facilitate diagnosis through signal amplification, and the artificial tissue engineering using biocompatible and/or biodegradable dendrimers.

Among many types of dendrimers, poly(amidoamine) (hereinafter, referred to as "PAMAM") dendrimer was developed by Dr. Donald A. Tomalia while he was at the Dow Chemical in the 1980s. The interior of the commercial PAMAM dendrimers is composed of aliphatic amine and amide groups and their surface groups can be amine, carboxylic acid, or hydroxyl groups. The following structures illustrate PAMAM dendrimers with the ethylenediamine as a core unit and the amine as terminal groups (A: second generation (G2) PAMAM dendrimer; B: G3 PAMAM dendrimer).

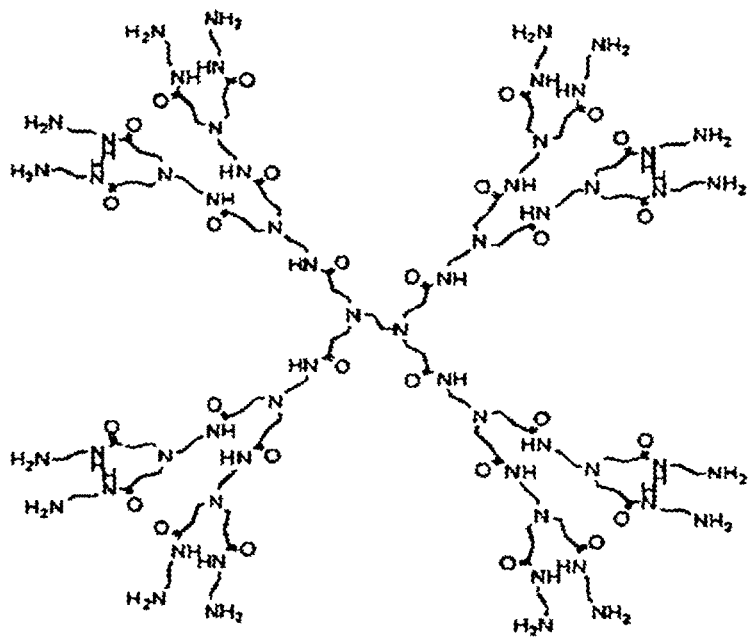

A

-continued

B

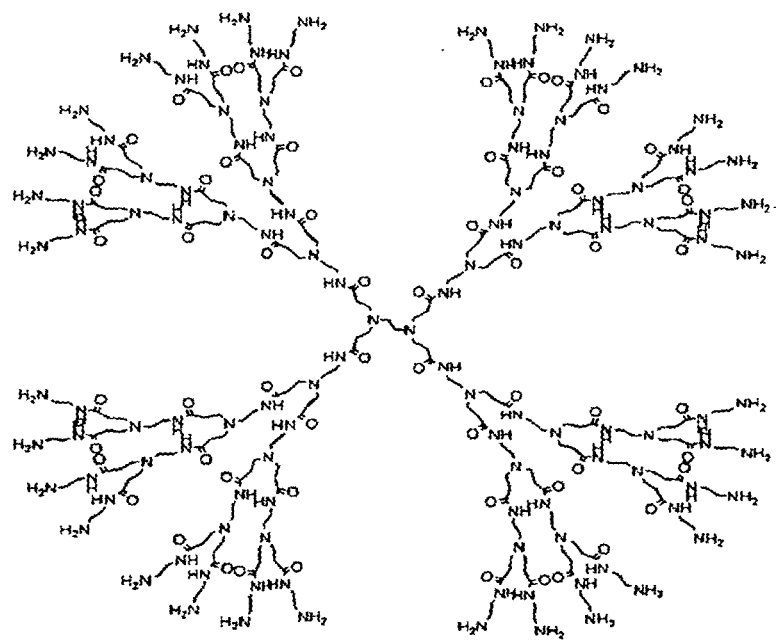

Photochromism refers to the phenomenon where the color of a compound or a system containing such compound changes reversibly by irradiation with UV and visible light. Photochromic compounds interconvert between two or more isomeric forms with different absorption properties and refractivity by irradiation using the light with its wavelength at the absorption range of each isomer.

Photochromic materials which can change color reversibly by light have applicability in various fields such as photorecorders, photoswitches, modulators, and the like. For example, diarylethene derivatives are photochromic compounds which change their colors upon exposure to UV light and revert to their original colors when irradiated with visible light. These diarylethene derivatives were first synthesized in 1985, and have been known as thermally stable photochromic compounds. Various diarylethene derivatives have been synthesized to date, and those substituted with fluorine are known to be particularly stable and rapid in the reversible color change [M. Irie, Chem. Rev. 2000, 100, 1685-1716; S. Nakamura, et al., J. Photochem. Photobiol. A: Chem. 2008, 200, 10-18].

While diarylethene derivatives dissolve well in most of the organic solvents, the use of diarylethene derivatives for biological applications has been limited due to their significantly low water-solubility. A recent report showed derivatization of diarylethene compounds with oligo(ethylene glycol) groups to convert them to water-soluble compounds [T. Hirose, et al., J. Org. Chem. 2006, 71, 7499-7508]. In addition, Japanese Patent Publication No. 2003-246776 discloses a method of crosslinking a photochromic compound and a biomolecule with a thiol functional group using the maleimide derivative in order to provide crosslinkable photochromic molecules which reversibly switched the structure of a biofunctional molecule and to provide a compound that can induce the biofunctional molecule capable of producing the mechanical energy. However, such molecules were inappropriate for biological applications due to their insolubility in water.

Photochromic compounds show reversible color change by irradiation with the light of a specific wavelength, which can be detected easily with UV-Vis spectrophotometer. As such, it may be useful to develop a detection method for biomolecules based on photochromic compounds that will allow for the reduction of the undesired background signals and improve the detection sensitivity.

Photochromic FRET (pcFRET) refers to the reversible switching of the fluorescence of a neighboring fluorophore through the fluorescence resonance energy transfer (FRET) using photochromic compounds such as azobenzene, diarylethene, spiropyran, fulgide, and so on as switch molecules [M. Irie et al., Nature 2002, 420, 759-760; L. Giordano, et al., J. Am. Chem. Soc. 2002, 124, 7481-7489; N. Soh, et al., Chem. Commun. 2007, 5206-5208]. A few recent examples exhibited applications of pcFRET to living biological systems for their reversible fluorescence switching [Y. Zou, et al., J. Am. Chem. Soc. 2008, 130, 15750-15751; U. Al-Atar, et al., J. Am. Chem. Soc. 2009, 131, 15966-15967; A. A. Beharry, et al., Angew. Chem. Int. Ed. 2011, 50, 1325-1327]. The most suitable photochromic compound for pcFRET is diarylethene because diarylethene derivatives generally have high thermal stability, high fatigue resistance, high sensitivity, and rapid response time.

The present inventors developed dendritic nanoclusters by oligomerizing dendrimers using a photochromic compound as a crosslinker where covalent linkages were formed between the surface groups of the dendrimers and the end groups of the photochromic compound and subsequently, by attaching a fluorophore and the excess amount of biocompatible surface modifiers to the surface of the dendrimer. These dendritic nanoclusters greatly improved the detection sensitivity of the fluorescence inside the biological systems and had high biocompatibility, and thereby the present inventors completed the present invention.

SUMMARY OF THE INVENTION

One object of the present invention is to provide a reversible fluorescence photoswitch based on the dye-crosslinked dendritic nanoclusters for high-contrast imaging of living biological systems.

Another object of the present invention is to provide a method for preparing the reversible fluorescence photoswitch based on the dye-crosslinked dendritic nanoclusters for high-contrast imaging of living biological systems.

In order to achieve these objects, the present invention provides a reversible fluorescence photoswitch based on the dye-crosslinked dendritic nanoclusters for high-contrast imaging of living biological systems.

The present invention also provides a method for preparing the reversible fluorescence photoswitch based on the dye-crosslinked dendritic nanoclusters for high-contrast imaging of living biological systems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 shows the results of reversible photoswitching experiments using dendritic nanocluster 1a (100 μg/mL), according to one Example of the present invention, as monitored by (a,b) UV/Vis and (c,d) fluorescent spectra.

FIG. 12 shows the results of reversible photoswitching experiments using a mixture of photochromic compound 3 (2.5 μM) and the fluorescent compound Cy3 (1 μM), according to one Example of the present invention, as monitored by (a,b) UV/Vis and (c,d) fluorescent spectra.

FIG. 19 shows the sectioned fluorescence images of a zebrafish which was incubated with 100 μg/mL of dendritic nanocluster 1b according to one Example of the present invention. Here, the scale bars correspond to 200 μm.

FIG. 22 shows [Reaction Formula 2].

DESCRIPTION OF THE PREFERRED EMBODIMENTS

Figure 1:
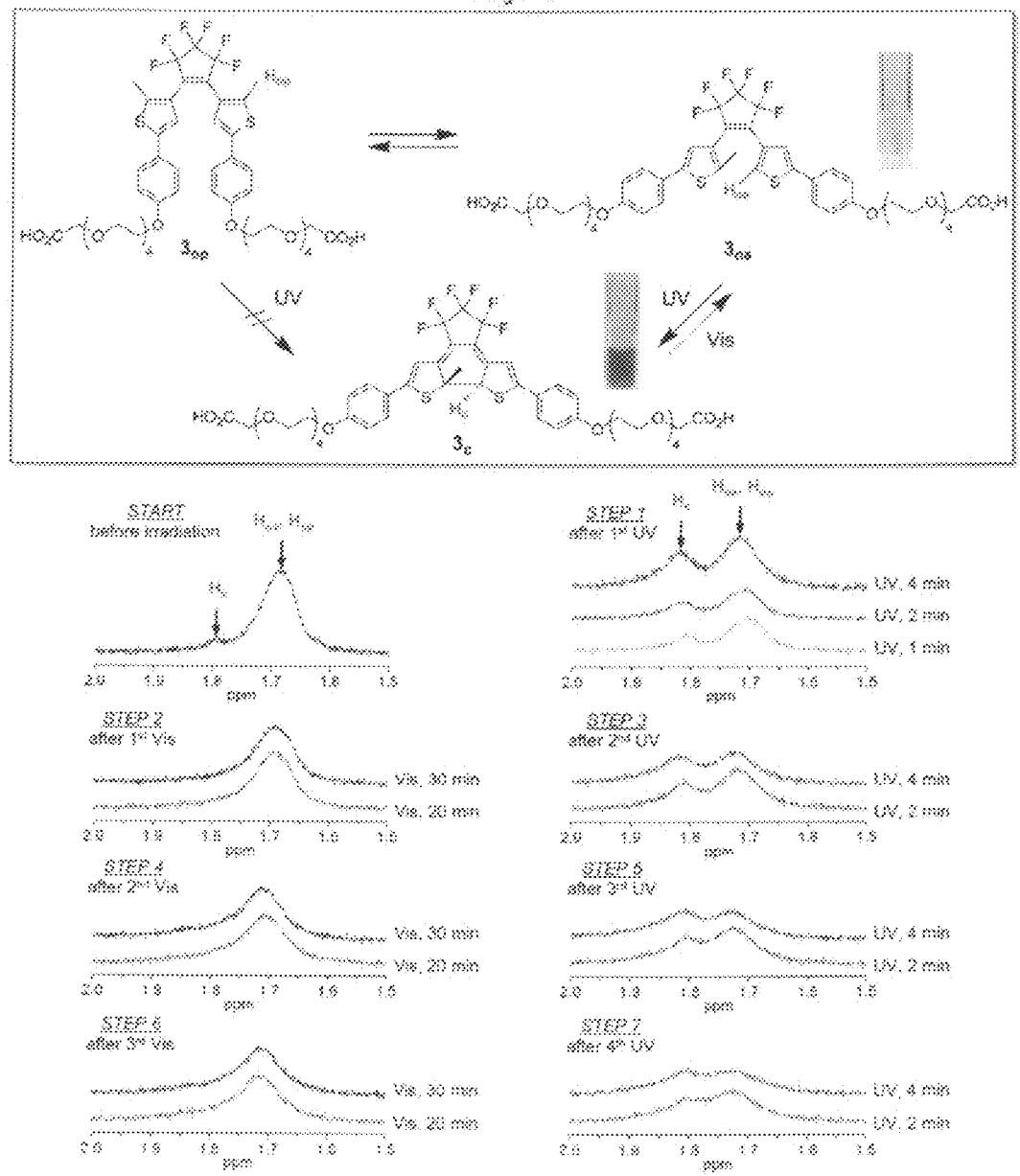
FIG. 1 illustrates the results of photoswitching experiments as monitored by $^1$H NMR. The relative amounts of three possible isomers (oa: antiparallel conformation of ring-open isomer; op: parallel conformation of ring-open isomer; c: ring-closed isomer) are shown after alternate irradiation of the photochromic compound 3, according to one Example of the present invention, with UV and visible light in sequence.
Figure 2:
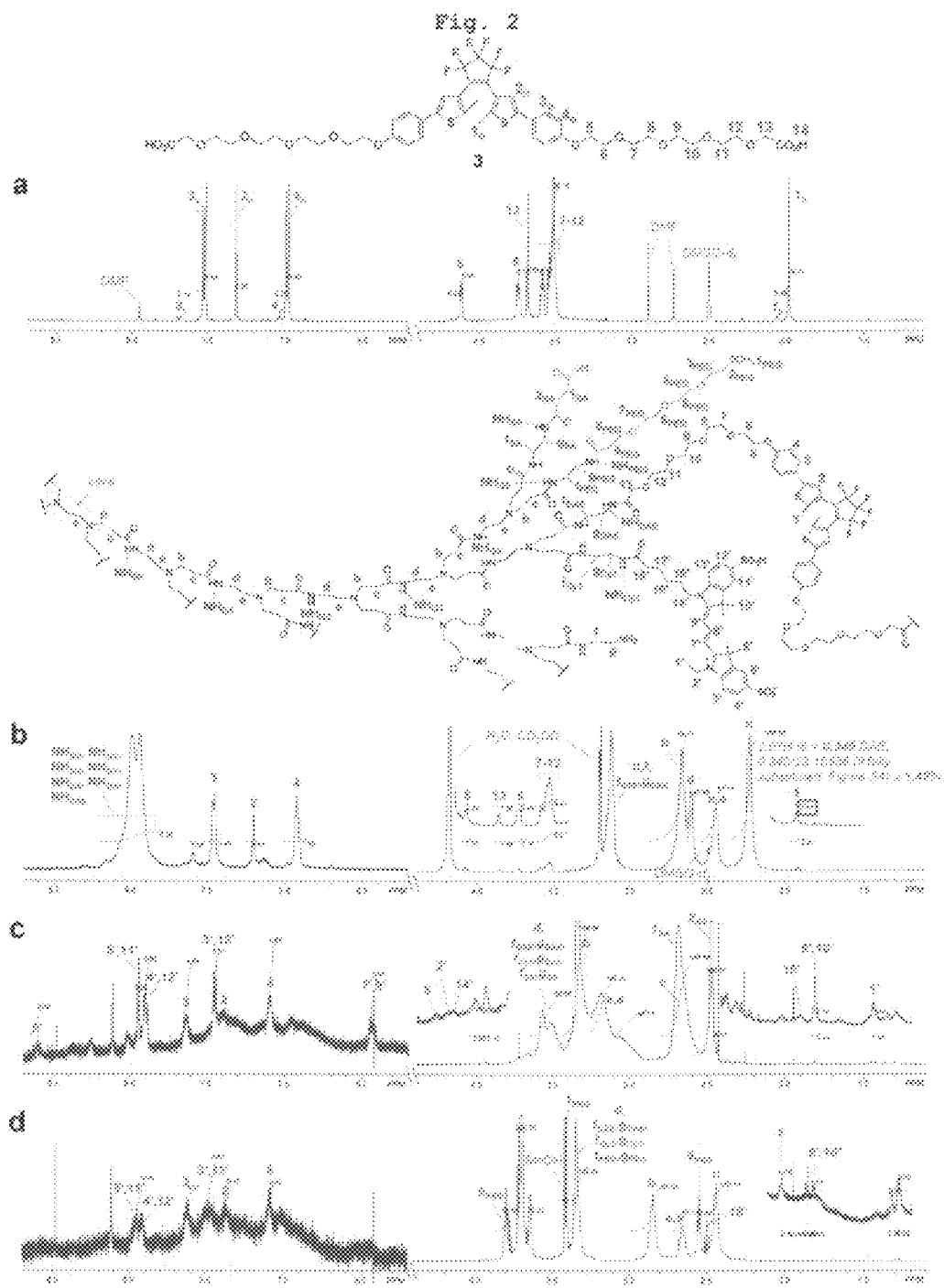
FIG. 2 shows the $^1$H NMR spectra of (a) the photochromic compound 3, (b) dendritic nanocluster 4, (c) dendritic nanocluster 1a, and (d) dendritic nanocluster 1b, according to one Example of the present invention.
Figure 3:
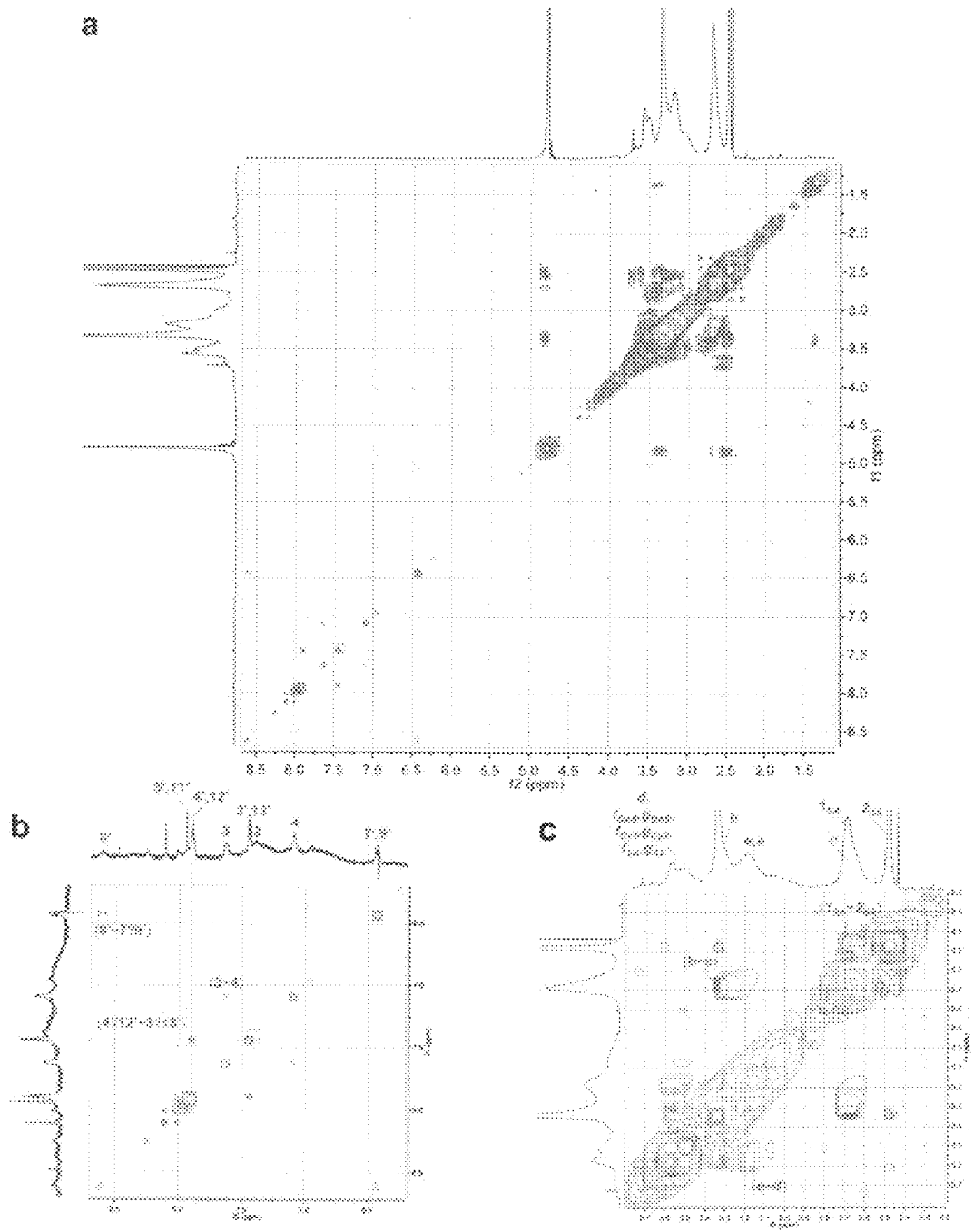
FIG. 3 is the COSY spectrum of the dendritic nanocluster 1a according to one Example of the present invention. Here, (a) is the full view, and (b) and (c) are the expanded views of the spectrum.
Figure 4:
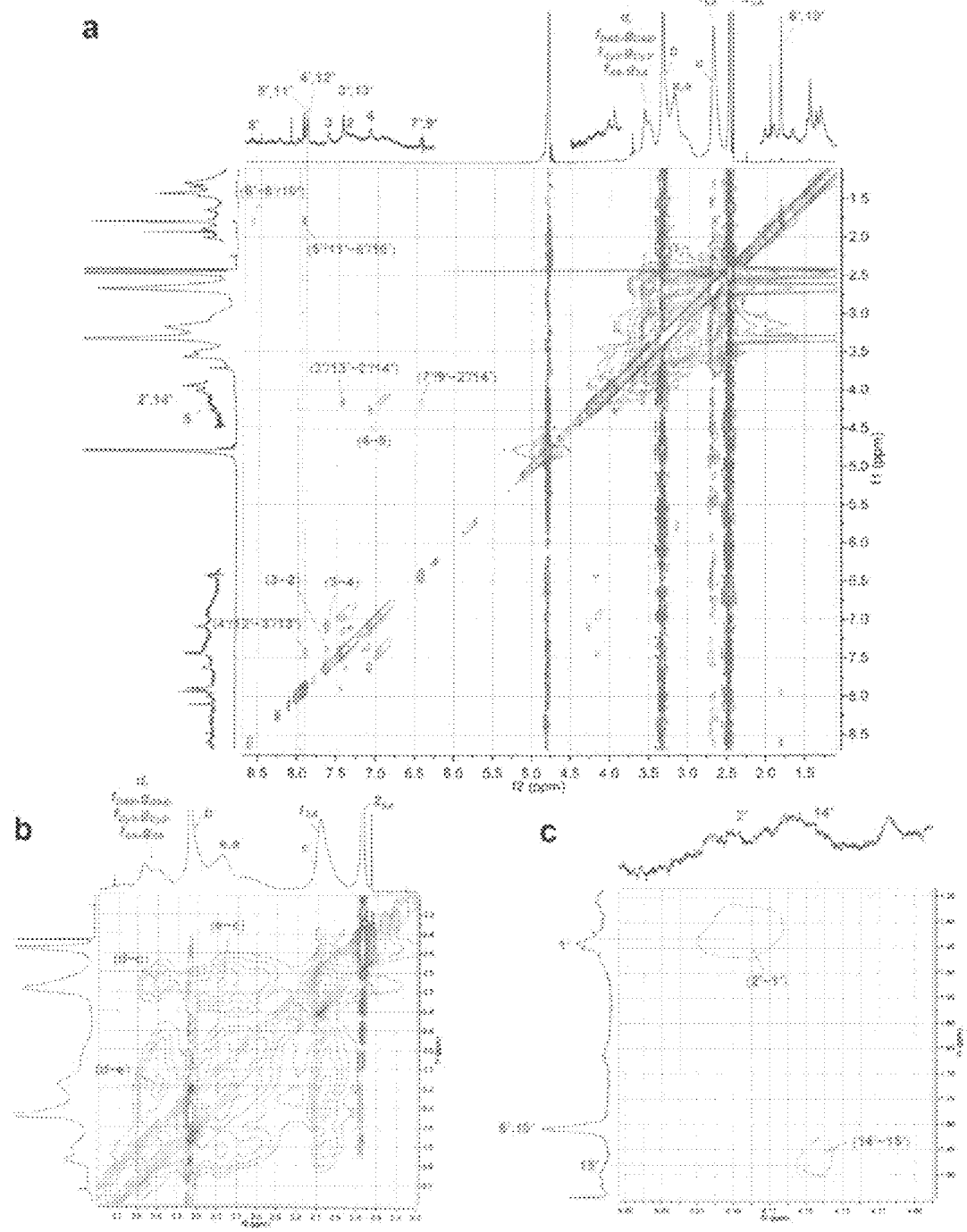
FIG. 4 is the NOESY spectrum of the dendritic nanocluster 1a according to one Example of the present invention. Here, (a) is the full view, and (b) and (c) are the expanded views of the spectrum.
Figure 5:
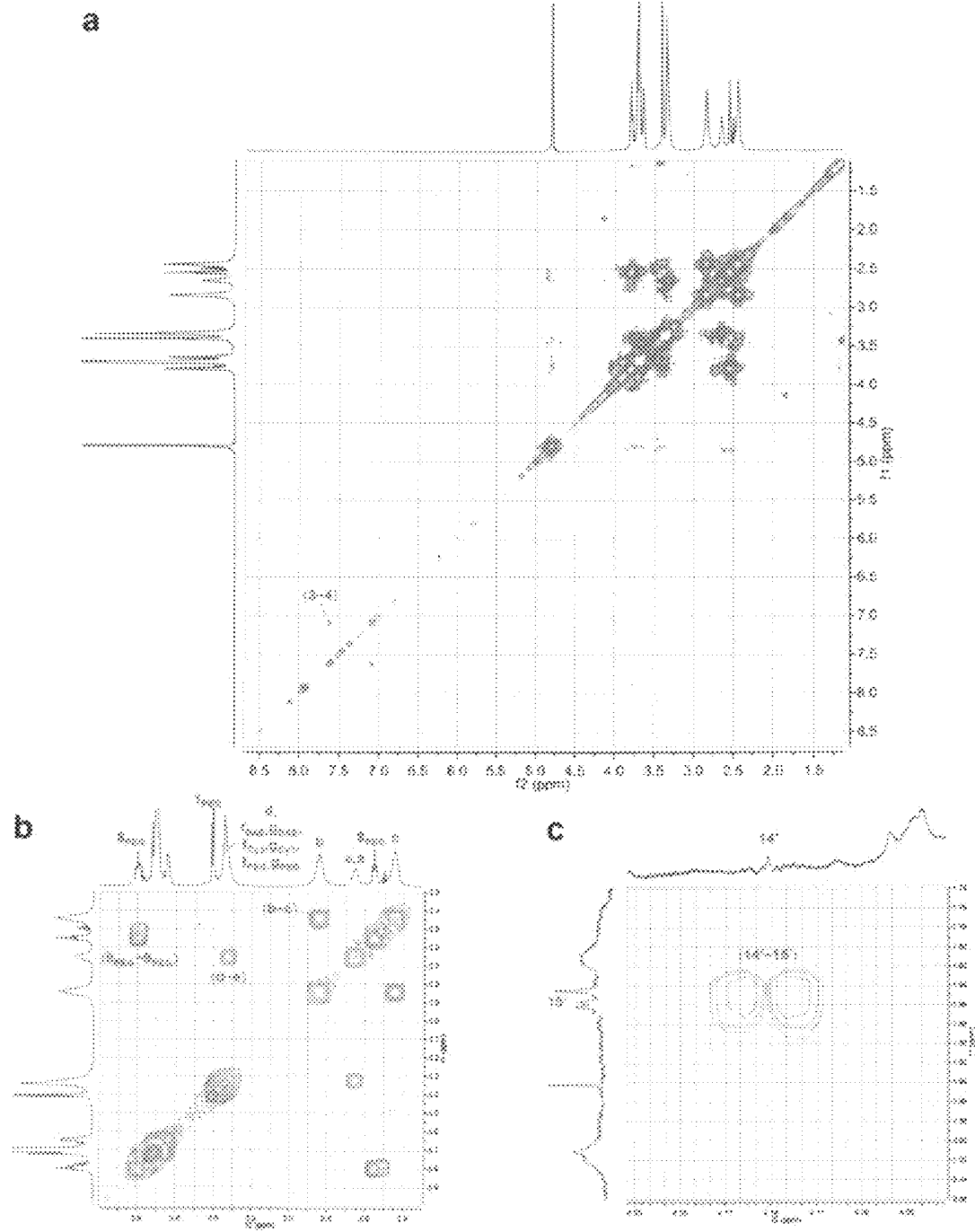
FIG. 5 is the COSY spectrum of the dendritic nanocluster 1b according to one Example of the present invention. Here, (a) is the full view, and (b) and (c) are the expanded views of the spectrum.
Figure 6:
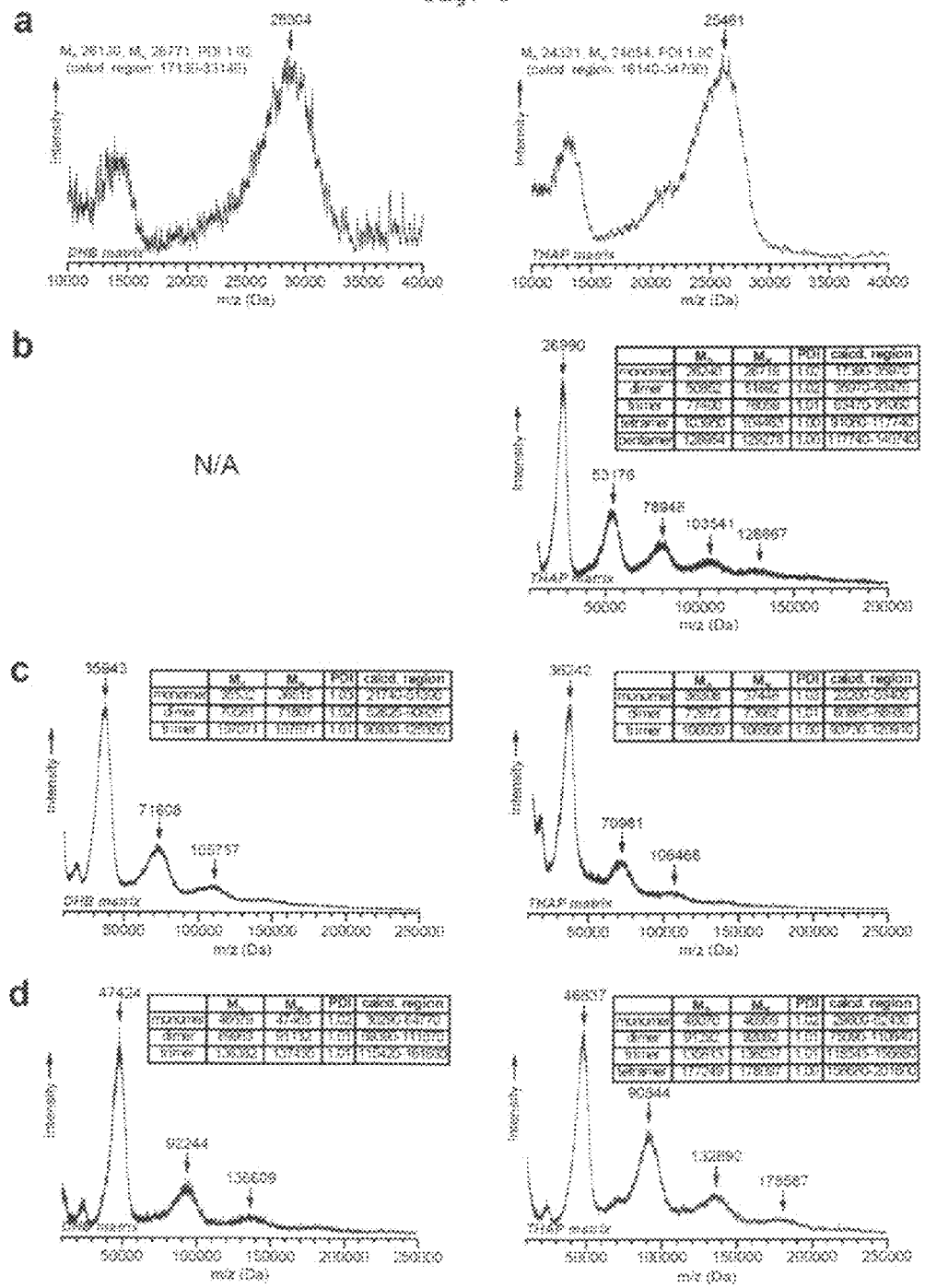
FIG. 6 shows the MALDI-TOF mass spectra of (a) G5 PAMAM dendrimer 2, dendritic nanoclusters (b) 4, (c) 1a, and (d) 1b, according to one Example of the present invention.
Figure 7:
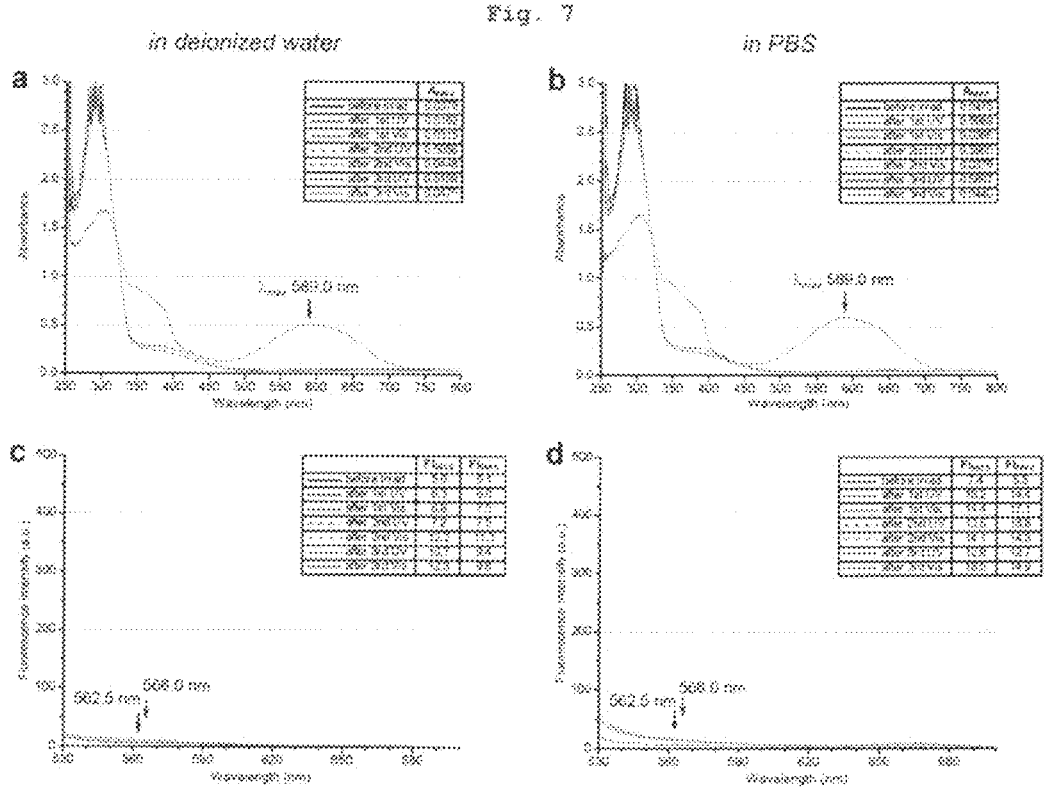
FIG. 7 shows the results of reversible photoswitching experiments using photochromic compound 3 (10 μM), according to one Example of the present invention, as monitored by (a,b) UV/Vis and (c,d) fluorescent spectra.
Figure 8:
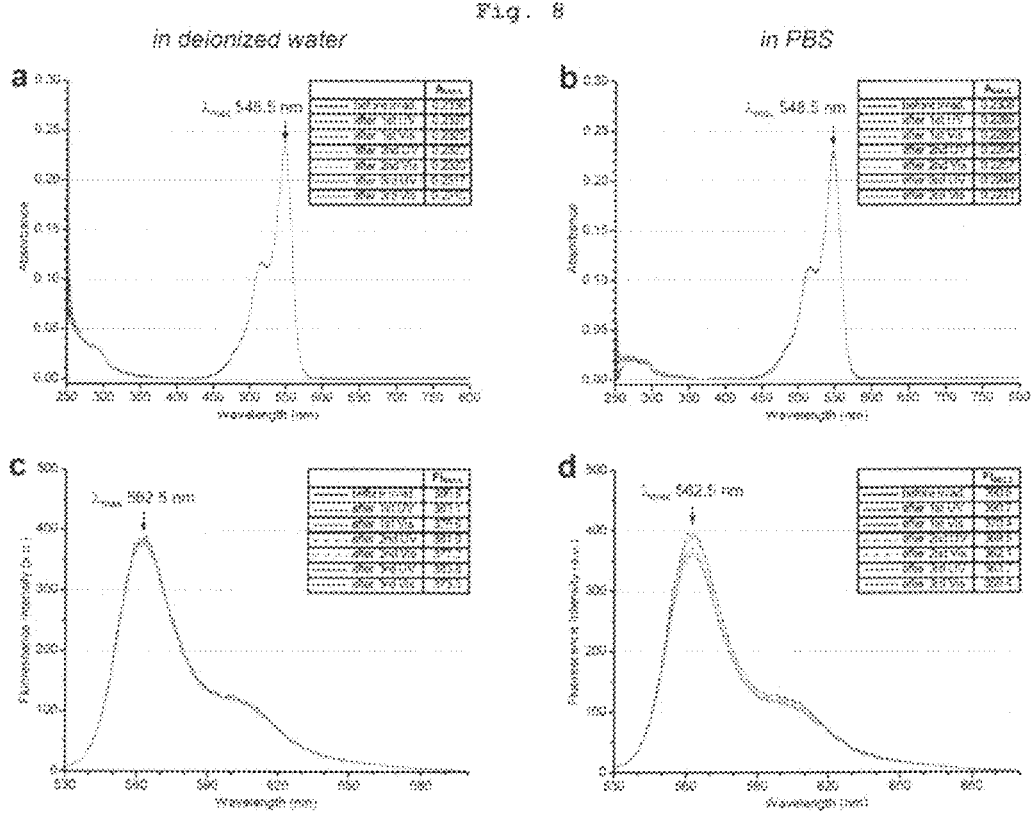
FIG. 8 shows the results of reversible photoswitching experiments using Cy3 (1 μM), a conventional fluorescent compound, as monitored by (a,b) UV/Vis and (c,d) fluorescent spectra.
Figure 10:
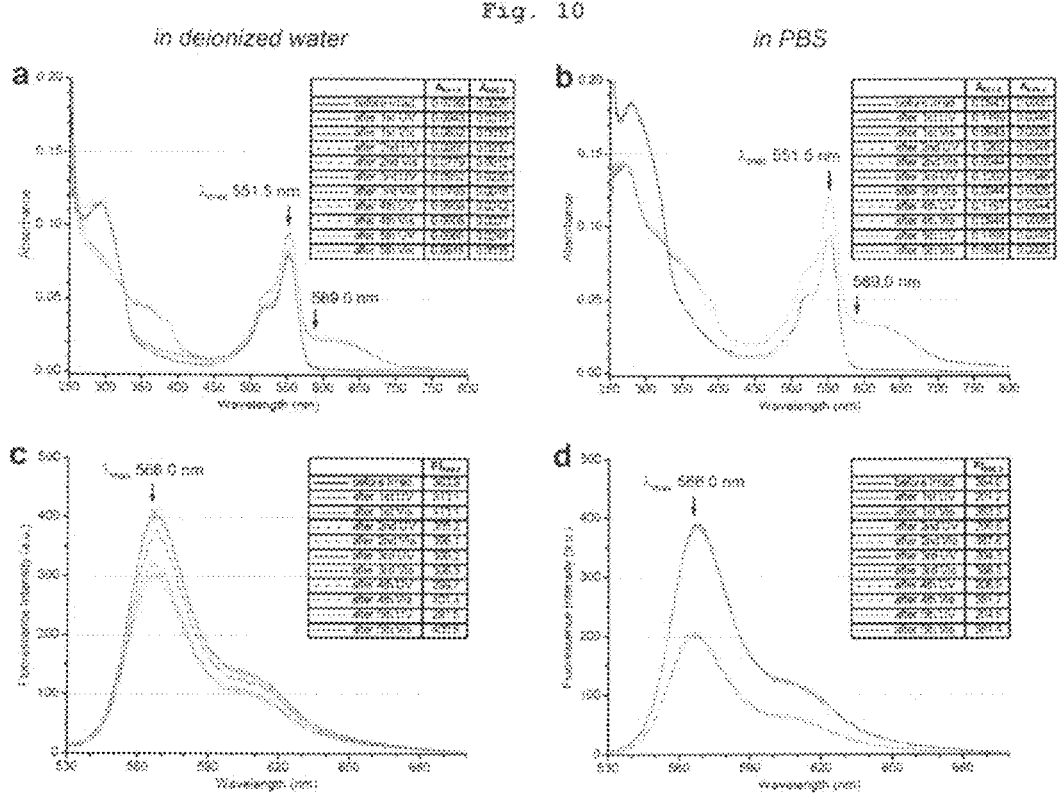
FIG. 10 shows the results of reversible photoswitching experiments using dendritic nanocluster 1b (100 μg/mL), according to one Example of the present invention, as monitored by (a,b) UV/Vis and (c,d) fluorescent spectra.
Figure 11:
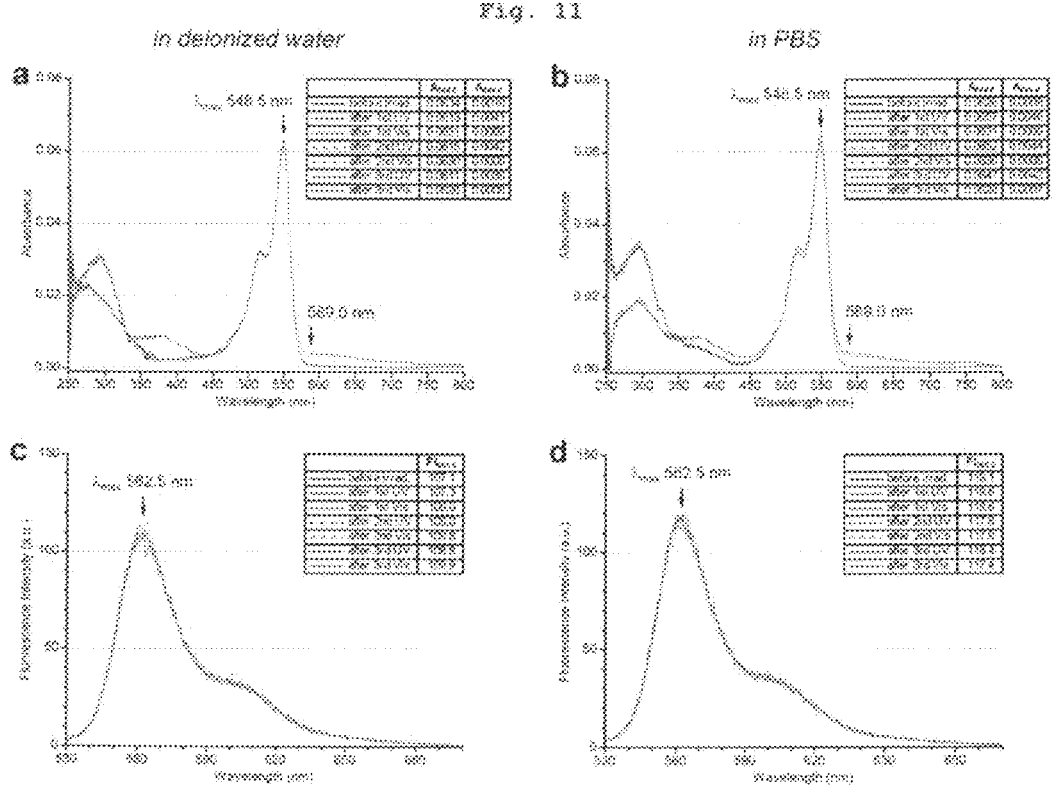
FIG. 11 shows the results of reversible photoswitching experiments using a mixture of photochromic compound 3 (1 μM) and the fluorescent compound Cy3 (0.4 μM), according to one Example of the present invention, as monitored by (a,b) UV/Vis and (c,d) fluorescent spectra.

Hereinafter, the present invention is described in detail.

The present invention provides a reversible fluorescence photoswitch based on the dye-crosslinked dendritic nanoclusters for high-contrast imaging of living biological systems, wherein: a central dendrimer is surrounded by one or more dendrimers, the respective dendrimers are crosslinked at their periphery to at least one neighboring dendrimer by at least one photochromic compound which can undergo photoswitching, and at least one fluorescent compound is attached to the surface of the resulting dendritic nanocluster and the distance between this fluorescent compound and the neighboring photochromic compound within the same dendritic nanocluster can enable FRET for photoswitching.

For the above-mentioned photochromic compound, azobenzene derivatives, spiropyran derivatives, diarylethene derivatives, fulgide derivatives, and the like may be used.

Preferably, the above-mentioned photochromic compound may be one of the diarylethene derivatives that is selected from the following group:

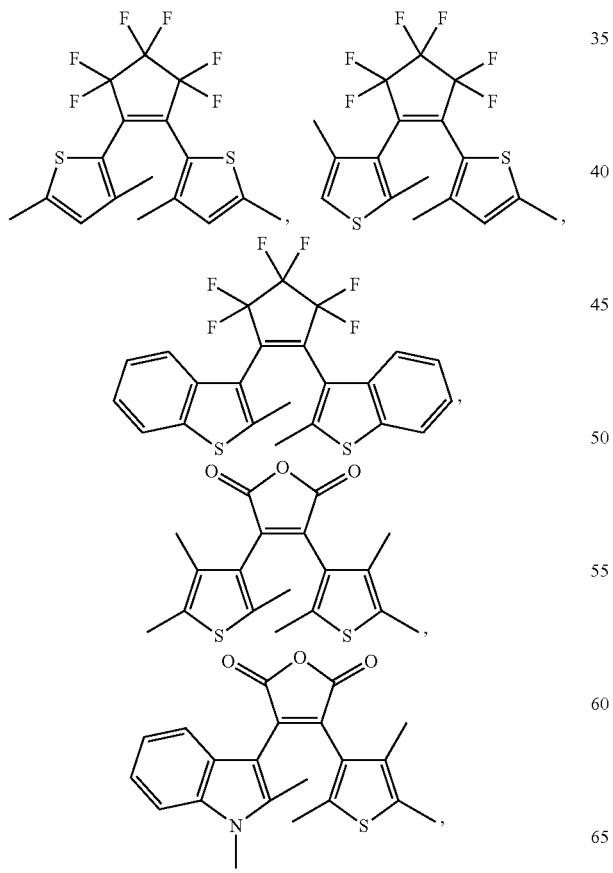

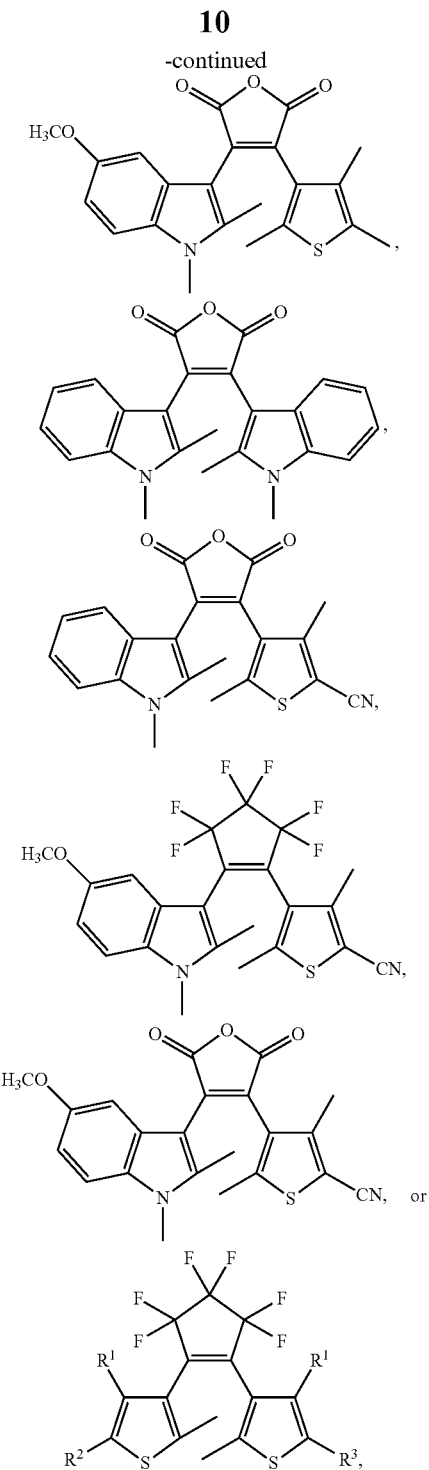

wherein $R^1$ is H or methyl, and $R^2$ and $R^3$ are H, linear or branched $C_1$ to $C_6$ alkyl, or unsubstituted or substituted $C_5$ to $C_7$ aryl or heteroaryl, and $R^2$ and $R^3$ may be identical or different.

The above-mentioned diarylethene derivative preferably has the chemical structure represented by the following chemical formula 3a, and the diarylethene derivative represented by the following chemical formula 3 is more preferable.

[Chemical formula 3a]

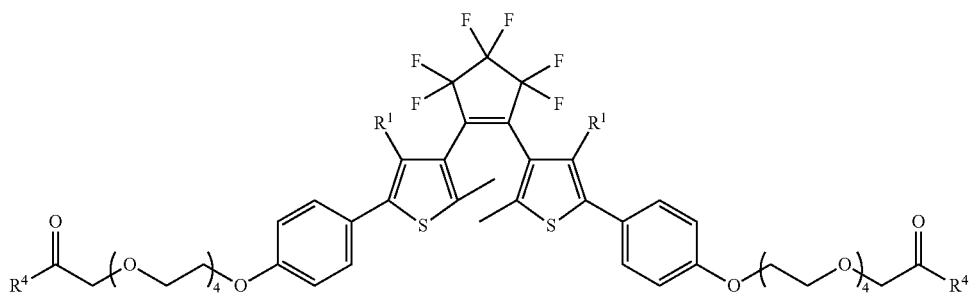

3a wherein
$R^1$ is defined as stated above,
$R^4$ is $-OR^5$ or $-NHR^5$, and
$R^5$ is H, linear or branched $C_1$ to $C_6$ alkyl, or unsubstituted or substituted $C_5$ to $C_7$ aryl or heteroaryl.

[Chemical formula 3]

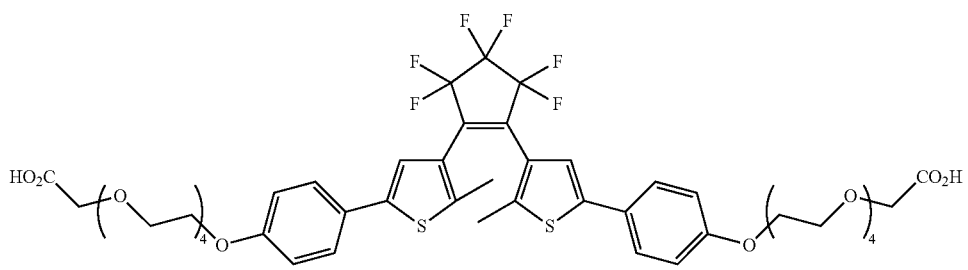

3

The above-mentioned dendrimer may be PAMAM dendrimer, polylysine dendrimer, poly(propyleneimine) (PPI) dendrimer, polyester dendrimer, poly(glutamic acid) dendrimer, poly(aspartic acid) dendrimer, polymelamine dendrimer, and the like, and preferably, among them, the fifth generation (G5) PAMAM dendrimer may be used.

Furthermore, the surface of the dendritic nanoclusters prepared from the G5 PAMAM dendrimer according to the present invention may be modified to a carboxylate group, a methoxy poly(ethylene glycol) (mPEG) group, or a methoxy oligo(ethylene glycol) (mOEG) group. Here, the surface of the dendritic nanoclusters becomes anionic by the carboxylate group and neutral by the mPEG or mOEG group. These anionic or neutral dendritic nanoclusters were designed to achieve biocompatibility, and between these two types of surface groups, the dendritic nanocluster with a neutral surface such as mPEG or mOEG groups turned out to be less toxic (see FIG. 13).

In addition, the fluorescent compound may be cyanine (hereinafter referred to as "Cy") series, Alexa Fluor series, BODIPY series, DY series, rhodamine derivatives, fluorescein derivatives, coumarin derivatives, and the like, and Cy series are preferable, and among Cy series, Cy3 is more preferable. The fluorescence of Cy3 is turned on and off by the photochromic diarylethene derivative which serves as a photoswitch.

Furthermore, the reversible fluorescence photoswitch based on the dye-crosslinked dendritic nanoclusters for high-contrast imaging of living biological systems according to the present invention, is composed of more than one dendrimers, and not a single dendrimer, which are linked radially by a photochromic diarylethene derivative as a crosslinker. Because the fluorescence intensity at the "on" state (after irradiation with visible light) of dendritic nanoclusters with multiple copies of fluorophore is higher than that of a corresponding monomeric dendrimer, the higher on-off contrast can be achieved by forming such nanoclusters.

In addition, the reversible fluorescence photoswitch based on the dye-crosslinked dendritic nanoclusters for high-contrast imaging of living biological systems according to the present invention can undergo reversible fluorescence switching by FRET. Here, when the dendritic nanoclusters are irradiated with UV light, the diarylethene moiety attached to the nanocluster becomes the ring-closed form (FRET acceptor) and quench the fluorescence of the fluorescent compound (FRET donor) attached on the same nanocluster. Subsequently, when the dendritic nanoclusters are irradiated with visible light, the diarylethene moiety becomes the ring-open form and fluorescence will be switched on. As such, the reversible switching is enabled.

Furthermore, the reversible fluorescence photoswitch based on the dye-crosslinked dendritic nanoclusters for high-contrast imaging of living biological systems according to the present invention can be internalized by skin permeation into a living zebrafish which has genetic similarity to humans. While internalization of nanomaterials into a living zebrafish is generally fulfilled through microinjection, the reversible fluorescence switch according to the present invention can be internalized into a living zebrafish through the skin permeation as well as the microinjection. Therefore, these dendritic nanoclusters could be useful for both in vivo and in vitro imaging as well as the ex vivo cell tracking applications. In addition, the reversible fluorescence photoswitch based on the dye-crosslinked dendritic nanoclusters for high-contrast imaging of living biological systems according to the present invention can be used for multimodal imaging by merging with other diagnostic in vivo imaging methods which can benefit from high-contrast imaging. Specifically, other diagnostic in vivo imaging methods may be magnetic resonance imaging (MRI), computed tomography (CT), positron emission tomography (PET), single photon emission computed tomography (SPECT), and the like. The reversible fluorescence photoswitch based on the dye-crosslinked dendritic nanoclusters for high-contrast imaging of living biological systems according to the present invention can also be applied to the diagnosis and treatment of diseases by attaching drug and targeting units.

In addition, the present invention provides a method for preparing the reversible fluorescence photoswitch based on the dye-crosslinked dendritic nanoclusters for high-contrast imaging of living biological systems.

The reversible fluorescence photoswitch based on the dye-crosslinked dendritic nanoclusters for high-contrast imaging of living biological systems according to the present invention can be obtained by linking more than one dendrimers through the photochromic compound which serves as a FRET acceptor, followed by the attachment of the fluorescent compound which serves as a FRET donor.

The method for preparing the dendritic nanoclusters is described in detail for those made from PAMAM dendrimers as an example.

Figure 21:
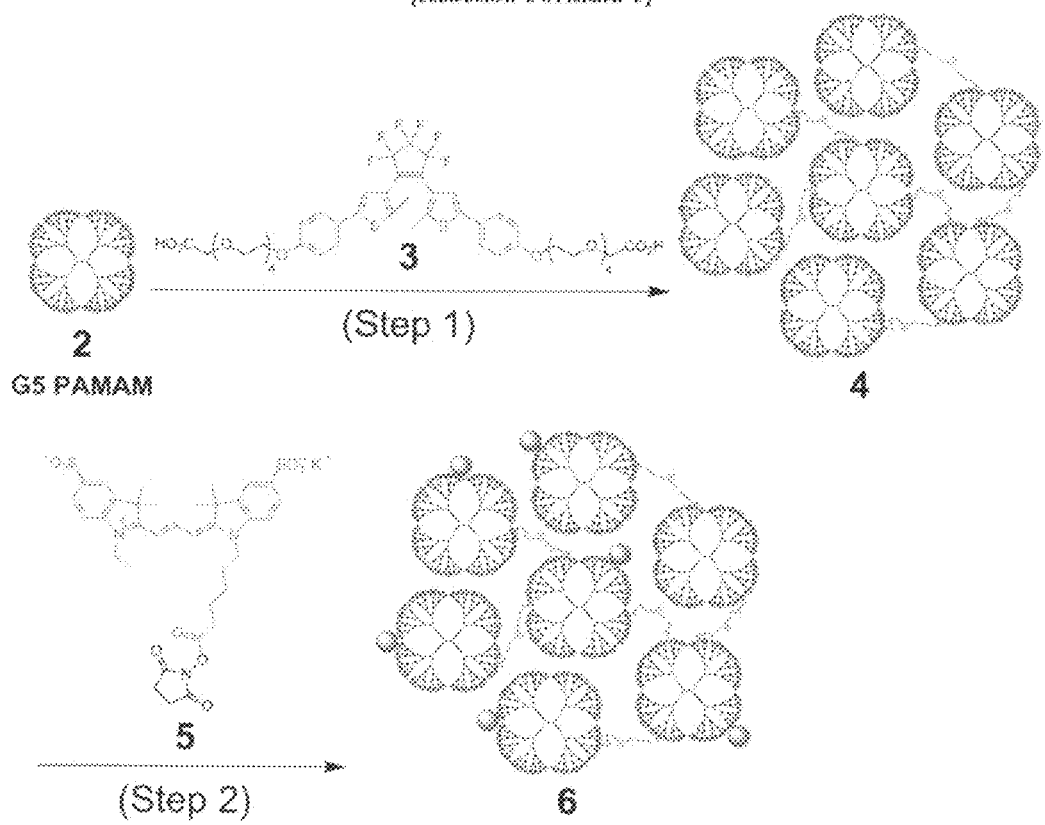
FIG. 21 shows [Reaction Formula 1].

PAMAM-based dendritic nanocluster according to one embodiment of the present invention can be prepared by a method including the steps:
preparing the dendritic nanocluster 4 by the reaction of G5 PAMAM dendrimer 2 and a photochromic diarylethene derivative 3 (step 1); and
preparing the dendritic nanocluster 6 which has the fluorescent Cy3 moieties attached on the surface by the reaction of dendritic nanocluster 4 obtained in step 1 and Cy3 mono N-hydroxysuccinimide ester (hereinafter, referred to as "Cy3-NHS") 5 (step 2), as represented in Reaction Formula 1 in FIG. 21.

Hereinafter, a method for preparing the PAMAM-based dendritic nanocluster according to one embodiment of the present invention is described step-by-step in detail.

Step 1:
Step 1 is the step to prepare dendritic nanocluster 4 by the reaction of G5 PAMAM dendrimer 2 and a photochromic diarylethene derivative 3.

Specifically, in this reaction step, the surface amino groups of the G5 PAMAM dendrimer 2 are coupled to the carboxylic acid end groups of the photochromic diarylethene derivative 3 to give dendritic nanocluster 4, where the coupling reaction was carried out using (benzotriazol-1-yl-oxy)tripyrrolidino-phosphonium hexafluorophosphate (hereinafter, referred to as "PyBOP") in dimethyl sulfoxide (DMSO) as a solvent.

Step 2:
Step 2 according to the present invention is the step to prepare the fluorescent dendritic nanocluster 6 wherein the fluorescent Cy3 moiety is attached to the surface of dendritic nanocluster 4 prepared in the step 1 by treating with Cy3-NHS 5.

Specifically, the dendritic nanocluster 6 is obtained by the reaction of dendritic nanocluster 4 and Cy3-NHS 5 in a mixture of water and methanol at room temperature for 14 h.

In addition, in one embodiment of the present invention, the dendritic nanocluster 1a having an anionic surface can be made by treating the Cy3-attached dendritic nanocluster 6 with succinic anhydride 7 (step A), and the dendritic nanocluster 1b having a neutral surface can be made by treating the Cy3-attached dendritic nanocluster 6 with tetra(ethylene glycol) methyl ether (mTEG)-NHS 8 (step B) to derivatize the periphery with mTEG group, a relatively short mOEG as represented in Reaction Formula 2 in FIG. 23.

Hereinafter, Steps A and B are described in further detail.
Step A:
Step A is the step to prepare dendritic nanocluster 1a having an anionic surface by the reaction of dendritic nanocluster 6, prepared in step 2, and succinic anhydride 7.

Specifically, the carboxylate-terminated anionic dendritic nanocluster 1a is made by adding succinic anhydride 7 to a solution of dendritic nanocluster 6 and allowing the corresponding mixture to stir for 3 d at room temperature.

Step B:
Step B is the step to prepare dendritic nanocluster 1b having a neutral surface by the reaction of dendritic nanocluster 6, prepared in step 2, and mTEG-NHS 8.

Specifically, the mTEG-terminated neutral dendritic nanocluster 1b is made by adding mTEG-NHS 8 to a solution of dendritic nanocluster 6 and allowing the corresponding mixture to stir for 3 d at room temperature.

Step A and step B are the reaction steps to make the surface charge of dendritic nanocluster become anionic and neutral, respectively. One thing to note here is that if a relatively long mPEG group (e.g., molecular weight higher than 2000) is used instead of mTEG in step B, the toxicity of the resulting nanocluster may increase significantly due to the heightened potential to aggregate. Accordingly, it is preferable to use a relatively short derivative such as mTEG which has four repeat units of ethylene glycol.

Hereinafter, the present invention is described in further detail with reference to the following examples and experimental examples.

However, the following examples are provided for illustrative purposes only, and the scope of the present invention should not be limited thereto in any manner.

Preparational Example 1

Preparation of Photochromic Diarylethene 3

Step 1: Preparation of Intermediate compound 11

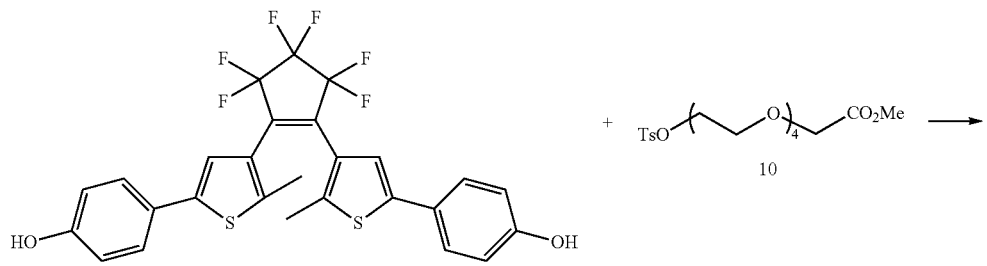

9

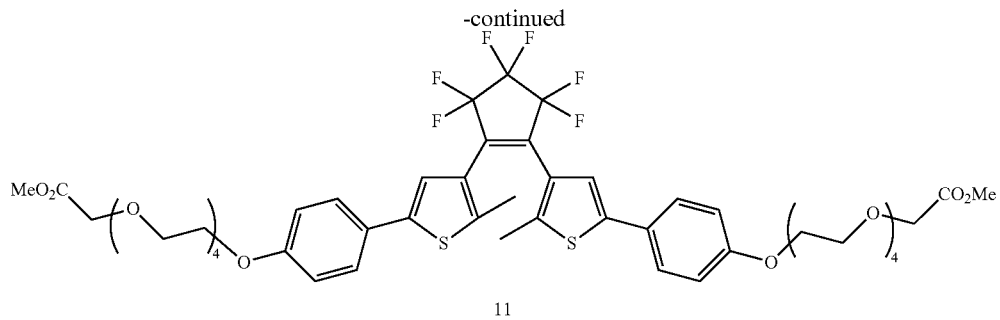

11

To a solution of diarylethene diphenol represented by Chemical Formula 9 (500 mg, 0.905 mmol) and the linker represented by Chemical Formula 10 (761 mg, 1.81 mmol) in N,N-dimethylformamide (DMF) (40 mL) was added oven-dried potassium carbonate ($K_2CO_3$) (376 mg, 2.72 mmol). The reaction mixture was stirred at 90° C. for 10 h, cooled to room temperature, and concentrated under reduced pressure. The residue was dissolved in methylene chloride ($CH_2Cl_2$; 100 mL), washed with water (50 mL×3), and the organic layer was dried over $MgSO_4$. After removal of the solvent under reduced pressure, the crude product was chromatographed on silica gel (ethyl acetate (EtOAc)) to give 750 mg of the target compound as represented by Chemical Formula 11 (0.715 mmol, 79%).

$R_f$: 0.60 [silica gel, 15:1 $CH_2Cl_2$/methanol (MeOH)];

$^1H$ NMR (500 MHz, DMSO-$d_6$; ring-open isomer) δ 7.54 (d, 4H, J=8.6 Hz, $H_{3o}$), 7.35 (s, 2H, $H_{2o}$), 6.99 (d, 4H, J=9.0 Hz, $H_{4o}$), 4.12 (4.123) (s, 4H, $H_{13}$), 4.12 (4.117) (t, 4H, J=4.6 Hz, $H_5$), 3.75 (t, 4H, J=4.7 Hz, $H_6$), 3.63 (s, 6H, $H_{14}$), 3.60-3.51 (m, 24H, $H_7$, $H_8$, $H_9$, $H_{10}$, $H_{11}$, and $H_{12}$), 1.96 (s, 6H, $H_{1o}$);

$^{13}C$ NMR (100 MHz, DMSO-$d_6$; ring-open isomer) δ 170.6, 158.5, 141.7, 140.0, 126.7, 125.2, 124.9, 121.1, 115.1, 70.0, 69.9, 69.8, 69.7 (69.709), 69.7 (69.683), 68.8, 67.6, 67.3, 51.3, 14.0;

HRMS (ESI) Calcd for $C_{49}H_{59}F_6O_{14}S_2Na$ $(M+Na)^+$: 1071.3064. Found: 1071.3063.

Step 2: Preparation of Diarylethene 3

The intermediate compound II obtained in Step 1 (341 mg, 0.325 mmol) was dissolved in tetrahydrofuran (THF; 5.2 mL), to which a 1 N aqueous solution of lithium hydroxide (LiOH; 1.30 mL) was added slowly at 0° C. The reaction mixture was brought to homogeneity by addition of methanol (1.3 mL), which was refluxed at 50° C. for 1.5 h and then stirred overnight at room temperature. At 0° C., a 2 N aqueous solution of $KHSO_4$ was added to neutralize the reaction to pH 4-5 and the mixture was stirred for 3 h allowing it to warm to room temperature slowly. The crude mixture was filtered through a short size-exclusion chromatography (SEC) column (Bio-Beads S-X1, H 6 cm×O.D. 0.7 cm) in DMF to remove salts, and then loaded on a SEC column (Sephadex LH-20, H 37 cm×O.D. 3.0 cm) for purification in methanol. The bluish column fractions were combined, concentrated under reduced pressure, and dried in vacuo to give 345 mg (0.337 mmol, 100%) of the target compound as represented by Chemical Formula 3 as a sticky cobalt solid.

$^1H$ NMR (500 MHz, DMSO-$d_6$; ring-open isomer) δ 7.53 (d, 4H, J=8.5 Hz, $H_{3o}$), 7.32 (s, 2H, $H_{2o}$), 6.99 (d, 4H, J=8.7 Hz, $H_{4o}$), 4.12 (t, 4H, J=4.6 Hz, $H_5$), 3.75 (t, 4H, J=4.5 Hz, $H_6$), 3.68 (s, 4H, $H_{13}$), 3.60-3.50 (m, 24H, $H_7$, $H_8$, $H_9$, $H_{10}$, $H_{11}$, and $H_{12}$), 1.98 (s, 6H, $H_{1o}$);

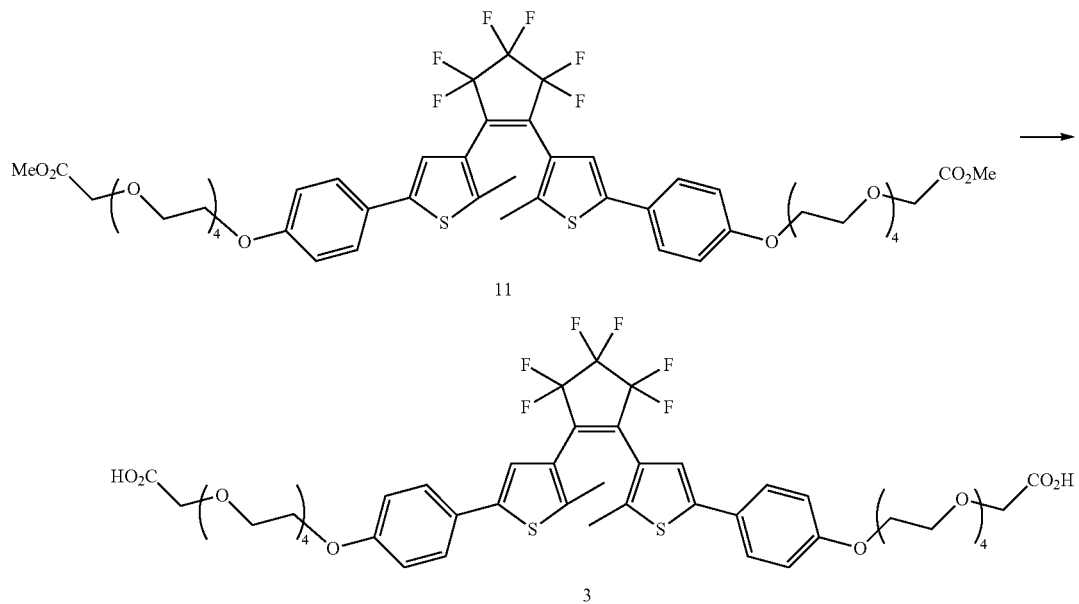

$^{13}$C NMR (100 MHz, DMSO-d$_6$; ring-open isomer) δ 172.0, 158.5, 140.0, 126.7, 125.2, 124.9, 121.3, 115.2, 70.1, 69.9, 69.7 (69.740), 69.7 (69.686), 69.6, 69.1, 68.9, 67.3, 14.0;

HRMS (ESI) Calcd for C$_{47}$H$_{53}$F$_6$O$_{14}$S$_2$ (M-H)$^-$: 1019.2786. Found: 1019.2781.

Example 1

Preparation of Dendritic Nanocluster 1a

Step 1: Preparation of Dendritic Nanocluster 4

A 90.76 mM solution of compound 3 prepared in Preparational Example 1 in DMSO-d$_6$ (120.0 µL, 10.89 µmol) was added to the dried dendrimer 2 (215.0 mg), and the mixture was dissolved completely in anhydrous DMSO (20 mL) with vigorous sonication. To this solution was added N,N-diisopropylethylamine (DIEA; 10.0 µL, 57.4 µmol) followed by a freshly prepared 20.0 mg/mL solution of PyBOP in DMSO (500 µL, 19.2 µmol). The reaction was flushed with argon gas and stirred at room temperature for 22 h. Next, the reaction mixture was dialyzed (Spectra/Por Biotech Regenerated Cellulose (RC) membrane, MWCO 3500, Spectrum Laboratories) against isopropanol (for 24 h) and methanol (×□2, for 24 h) with stirring. After removal of the solvent under reduced pressure, the crude product was first filtered through a short SEC column (Sephadex LH-20, H 6 cm×O.D. 0.7 cm) and then purified by a preparative SEC (Sephadex LH-20, H 40 cm×O.D. 3.0 cm), both using methanol as an eluent. The first major bluish band which was stained by ninhydrin contained the desired product as confirmed by $^1$H NMR. Thus, the corresponding SEC fractions were combined—the first and last fractions were eliminated deliberately to reduce the polydispersity—and dried in vacuo to give 143.2 mg of dendritic nanocluster 4 as a faint bluish solid.

$^1$H NMR (600 MHz, 1:1 CD$_3$OD/DMSO-d$_6$) δ 8.16-7.94 (m, 9.39H, NH$_{G5}$, NH$_{G4}$, NH$_{G3}$, NH$_{G2}$, NH$_{G1}$, NH$_{G0}$, and NH$_{DAE}$), 7.46 (m, 1.48H, H$_3$), 7.20 (s, 0.67H, H$_2$), 6.92 (m, 1.53H, H$_4$), 4.08 (m, 2.20H, H$_5$), 3.86 (s, 1.38H, H$_{13}$), 3.73 (m, 2.44H, H$_6$), 3.59-3.52 (m, 9.87H, H$_7$, H$_8$, H$_9$, H$_{10}$, H$_{11}$, and H$_{12}$), 3.12 (m, H$_d$, H$_f$ H$_{fDAE}$ and H$_{gDAE}$), 2.67 (m, 99.77H, H$_b$), 2.61 (m, 47.96H, H$_g$), 2.45 (m, 51.14H, H$_e$ and H$_a$), 2.23 (m, 100H, H$_c$), 1.92 (s, 2.07H, H$_1$).

Step 2: Preparation of Dendritic Nanocluster 6

Dendritic nanocluster 4 obtained in Step 1 (48.4 mg) was dissolved in a mixture of MeOH (1 mL) and water (2 mL) with vigorous sonication, and then DIEA (30.0 µL, 172 µmol) was added to this solution. With stirring, a solution of Cy3-NHS (1.0 mg, 75.87% reactive chromophore content, 0.991 µmol) in 100 µL of DMSO-d$_6$ was added to the mixture of 4 dropwise over a 1-min period. The reaction was protected from light and stirred at room temperature for 14 h. The crude product was used for next step without purification.

Step 3: Preparation of Dendritic Nanocluster 1a with Anionic Surface

To the crude reaction mixture of dendritic nanocluster 6 obtained in Step 2 (1.63 mL) was added succinic anhydride (91.1 mg, 910 µmol) dissolved in DMSO-d$_6$ (500 µL). The reaction was protected from light and stirred vigorously at room temperature for 3 d. In a dark room, the crude mixture was first filtered through a short SEC column (Sephadex G-25, H 4 cm×O.D. 1.7 cm) in deionized water, and then loaded on a SEC column (Sephadex G-25, H 37 cm×O.D. 4.5 cm) for purification in deionized water. An intense pink band which eluted first was confirmed to contain the desired compound as determined by $^1$H NMR. Thus, the corresponding SEC fractions were combined, water was removed under reduced pressure, and the residue was dried in vacuo to give 31.7 mg of the target compound 1a as a pink solid.

$^1$H NMR (600 MHz, D$_2$O) δ 8.61 (t, 0.22H, J=13.2 Hz, H$_{8'}$), 7.95 (m, 0.35H, H$_{5'}$ and H$_{11'}$), 7.91-7.89 (m, 0.55H, H$_{4'}$ and H$_{12'}$), 7.63 (m, 0.54H, H$_3$), 7.46-7.44 (m, 0.61H, H$_{3'}$ and H$_{13'}$), 7.39 (m, H$_2$), 7.09 (m, 0.69H, H$_4$), 6.43 (m, 0.45H, H$_{7'}$ and H$_{9'}$), 4.27 (m, H$_5$), 4.20 (m, H$_{2'}$), 4.16 (m, H$_{14'}$), 3.57-3.49 (m, 82.66H, H$_d$, H$_{fDAE}$, H$_{gDAE}$, H$_{fCy3}$, H$_{gCy3}$, H$_{fSA}$, and H$_{gSA}$), 3.34 (m, H$_b$), 3.18 (m, H$_e$ and H$_a$), 2.69 (m, 145.59H, H$_c$ and H$_{1SA}$) 2.48 (m, 122.35H, H$_{2SA}$), 1.90 (m, H$_{15'}$), 1.80 (m, 2.14H, H$_{6'}$ and H$_{10'}$), 1.44 (m, 1.44H, H$_{1'}$).

Example 2

Preparation of Dendritic Nanocluster 1b with Neutral Surface

To the crude reaction mixture of dendritic nanocluster 6 obtained by the same methods with Step 1 and Step 2 in the Example 1 (1.50 mL) which was transferred to a separate flask was added mTEG-NHS 8 (146 mg, 439 µmol) dissolved in DMSO-d$_6$ (500 µL). The reaction was protected from light and stirred vigorously at room temperature for 3 d. In a dark room, the crude product was first filtered through a short SEC column (Sephadex G-25, H 4 cm×O.D. 1.7 cm) in deionized water, and then loaded on a SEC column (Sephadex G-25, H 37 cm×O.D. 4.5 cm) for purification in deionized water. An intense pink band which eluted first was confirmed to contain the desired compound as determined by $^1$H NMR. Thus, the corresponding SEC fractions were combined, water was removed under reduced pressure, and the residue was dried in vacuo to give 30.5 mg of the target compound 1b as a pink solid.

$^1$H NMR (600 MHz, D$_2$O) δ 7.95 (m, H$_{5'}$ and H$_{11'}$), 7.92 (m, H$_{4'}$ and H$_{12'}$), 7.62 (m, 0.37H, H$_3$), 7.49-7.46 (m, 0.62H, H$_{3'}$ and H$_{13'}$), 7.37 (m, 0.43H, H$_2$), 7.09 (m, 0.42H, H$_4$), 3.80 (m, 50.68H, J=6.1 Hz, H$_{8PEG}$), 3.41 (s, 70.15H, H$_{1PEG}$), 3.35 (m, 132.33H, H$_d$, H$_{fDAE}$, H$_{gDAE}$, H$_{fCy3}$, H$_{gCy3}$, H$_{fPEG}$, and H$_{gPEG}$) 2.84 (m, 100H, H$_b$), 2.66 (m, 48.17H, H$_e$ and H$_a$), 2.55 (t, 43.68H, J=6.1 Hz, H$_{9PEG}$), 2.50 (t, J=6.8 Hz, H$_{18'}$), 2.44 (m, 103.74H, H$_c$), 2.01 (m, 0.75H, H$_1$) 1.81 (m, 0.53H, H$_{6'}$ and H$_{10'}$).

Experimental Example 1

Cytotoxicity Assays

Figure 13:
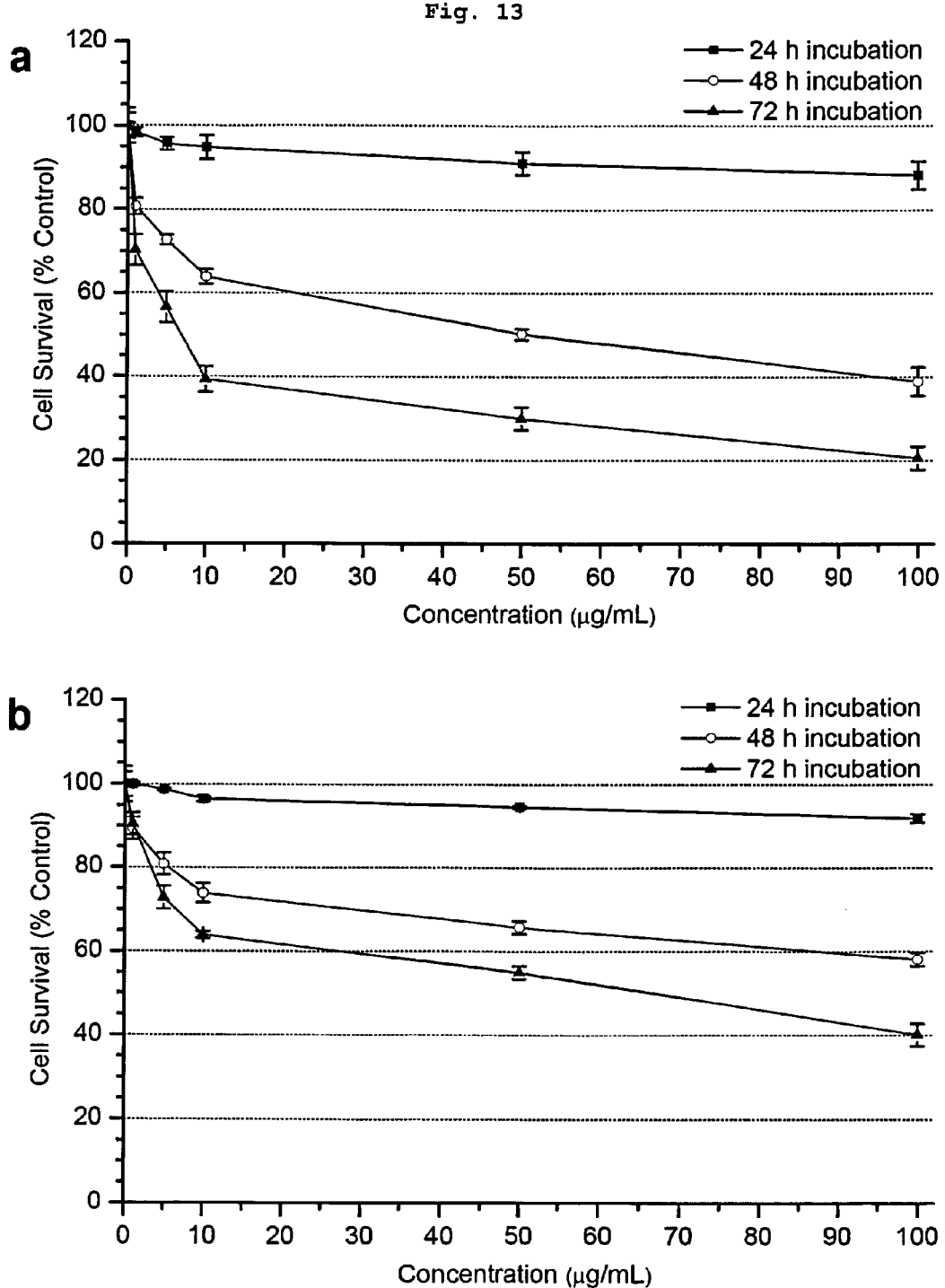
FIG. 13 shows the results of cytotoxicity assays of dendritic nanoclusters (a) 1a and (b) 1b at HeLa cell cultures, according to one Example of the present invention.

A stock solution of dendritic nanocluster was prepared by dissolving 30 mg of a vacuum-dried dendritic nanocluster 1a or 1b obtained in the Examples 1 or 2 in 3.0 mL of deionized water (Millipore Milli-Q) to make a 10 mg/mL solution. Each stock solution was sonicated briefly to ensure homogeneity. Serial dilutions were carried out using serum-free DMEM to prepare samples of the following concentrations: 1, 5, 10, 50, and 100 µg/mL. HeLa cells were seeded in a flat bottomed 96-well plate (Corning Costar, Cambridge, Mass.) at a density of $1\times10^3$ cells per well and incubated for 24 h at 37° C. under a 5% $CO_2$ atmosphere to allow cell attachment. Cells were treated with 100 µL of each dilution or 100 µL of serum-free DMEM (as a control) per well and incubated at 37° C. under a 5% $CO_2$ atmosphere for 24, 48, or 72 h. The formulations were replaced with serum-free DMEM containing 5 mg/mL 3-(4,5-dimethylthiazol-2-yl)-2,5-diphenyltetrazolium bromide (MTT) and cells were incubated for additional 4 h. MTT was removed by aspiration and DMSO (100 µL) was added to each well to dissolve the formazan crystals. Absorbance was measured at 570 nm using a BioRad microplate reader and the results are shown in FIG. 13. Assays were carried out in quadruplicates.

As shown in FIG. 13, ≥20% cell survival was observed when dendritic nanocluster 1a at 100 µg/mL was incubated with HeLa cells for 72 h, whereas ≥40% cell survival was exhibited when dendritic nanocluster 1b was used under the same conditions. Therefore, it is suggested that dendritic nanocluster 1b with a neutral surface has lower toxicity than dendritic nanocluster 1a with an anionic surface.

Experimental Example 2

Cellular Uptake Studies

HeLa cells were seeded in a Lab-Tek II 8-well microscope sample chamber (Nunc) at a density of $1\times10^4$ cells per well. Stock solutions (10 mg/mL) of dendritic nanoclusters 1a and 1b prepared in the Examples 1 and 2 were diluted using serum-free DMEM to prepare solutions of 10 µg/mL and 100 µg/mL concentrations. Cells were treated with 200 µL of each dilution per well and incubated at 37° C. under a 5% $CO_2$ atmosphere for the following time periods: 5, 15, 30, 45, 60, 120, and 180 min. A well seeded with the same number of cells and containing 200 µL of serum-free DMEM was prepared simultaneously as a control. Cells were washed three times with Dulbecco's phosphate buffered saline (PBS; 1×, pH 7.4, Gibco) and fixed by treating with 4% paraformaldehyde (PFA) for 20 min at room temperature. Subsequently, cells were washed with PBS three times to remove PFA, treated with 2 mg/mL of 4,6-diamidino-2-phenylindole (DAPI) in PBS for 10 min, and washed with PBS three times. The internalization profiles of dendritic nanoclusters 1a and 1b into HeLa cells were obtained using the DeltaVision RT imaging system (Applied Precision) with filter sets of RD-TR-PE ($\lambda_{ex}$ 555 nm, $\lambda_{em}$ 617 nm) and/or DAPI ($\lambda_{ex}$ 360 nm, $\lambda_{em}$ 457 nm). The results are shown in FIGS. 14 and 15.

Figure 14:
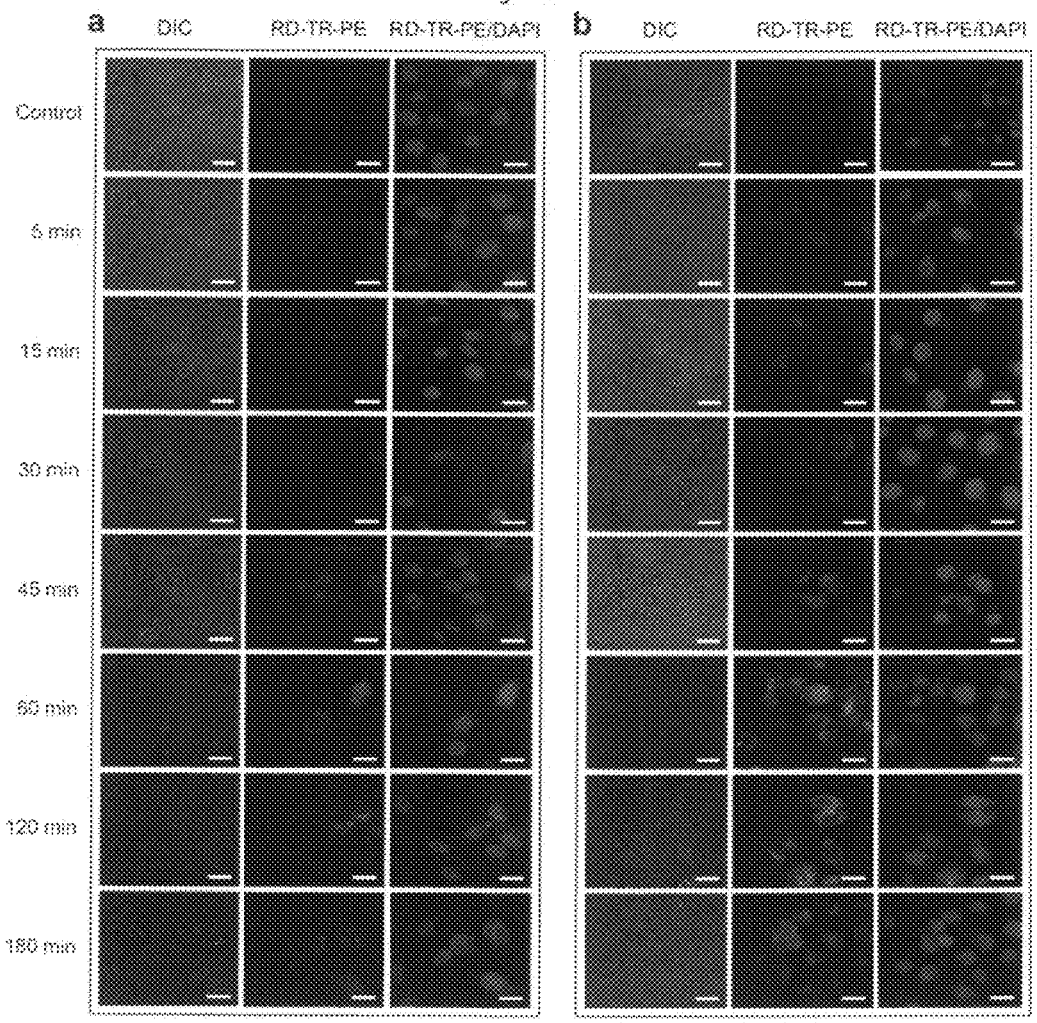
FIG. 14 shows the fluorescence microscopy results after incubating the HeLa cell cultures with dendritic nanocluster 1a, according to one Example of the present invention, each for the corresponding period. Here, the final concentrations are (a) 10 μg/mL and (b) 100 μg/mL, and the scale bars correspond to 20 μm.
Figure 15:
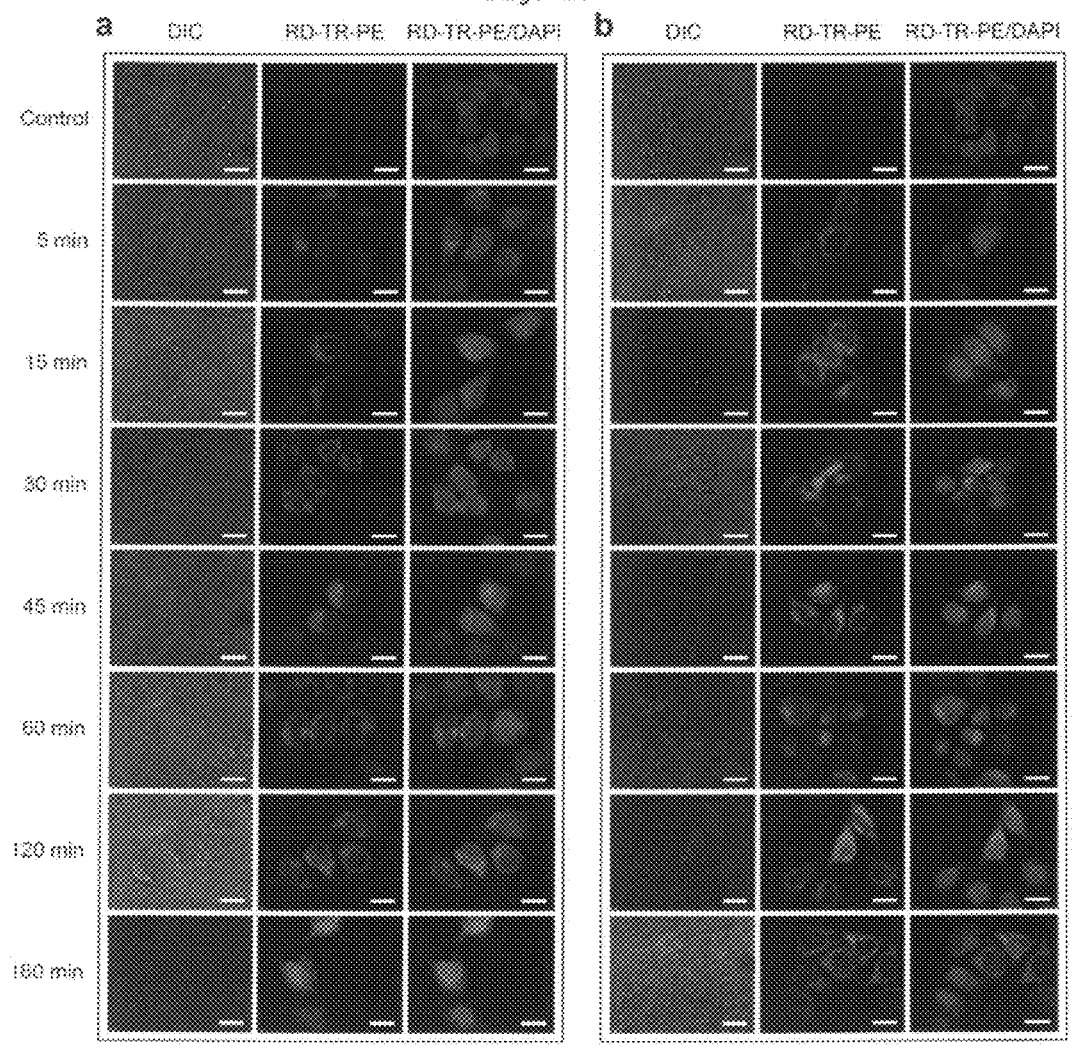
FIG. 15 shows the fluorescence microscopy results after incubating the HeLa cell cultures with dendritic nanocluster 1b, according to one Example of the present invention, each for the corresponding period. Here, the final concentrations are (a) 10 μg/mL and (b) 100 μg/mL, and the scale bars correspond to 20 μm.

As shown in FIGS. 14 and 15, in general, increasing amounts of dendritic nanoclusters 1a and 1b were taken up by cells with longer incubation times.

Experimental Example 3

Photoswitching Experiments Using Solution Samples

Each of 1.0 mL solution of diarylethene 3 (10 µM), Cy3 compound (1.0 µM, as a carboxylic acid form of 5), dendritic nanocluster 1a (100 µg/mL), dendritic nanocluster 1b (100 µg/mL), and a mixture of diarylethene 3 and Cy3 in either deionized water or Dulbecco's PBS (1×, pH 7.4, Gibco) was added to a standard disposable cuvette (10 mm path length, 4.5 mL nominal capacity, 4 optical sides, polymethylmethacrylate, Kartell). Then, the cuvette containing the sample solution was fixed in a sample holder, and the solution was irradiated for 2 min with a UV lamp (365 nm, 115 V, 60 Hz, 0.2 A, 8 W, Spectroline). For the measurement of UV absorption, the UV-irradiated sample solution was immediately transferred into a semi-micro disposable cuvette (10 mm path length, 1.6 mL nominal capacity, polymethylmethacrylate, Sarstedt) at dark and scanned (250-800 nm scan range, 0.5 nm interval, 600 nm/min scan speed) using a Beckman Coulter DU 800 spectrophotometer. Before each UV scan, the blank solution (deionized water or PBS, 1.0 mL) was scanned as a reference. For the measurement of fluorescence emission, the UV-irradiated sample solution was immediately transferred into a quartz Suprasil macro/semi-micro cell (4 mm path length, 0.5 mL nominal capacity, Perkin Elmer) at dark and scanned (500-700 nm scan range, irradiation at 510 nm, 5 nm excitation slit, 3.5 nm emission slit) using a Perkin Elmer LS 55 fluorescence spectrometer. Next, the sample solution was transferred back to a standard disposable cuvette (Kartell) at dark and irradiated for 30 min with a 590 nm laser beam (250-255 mW at 590 nm as measured through a magnifier lens at 25 t, Sail Laser) which was placed 4 cm apart from the center of the sample holder. For the irradiation with a 590 nm light, a magnifier lens was placed in between the sample solution and the laser beam, in order to simultaneously irradiate the entire area of the sample solution. The absorption and emission spectra of the sample solution irradiated with a 590 nm light was obtained in the same manner. A single photoswitching cycle consisting of the sequential irradiation with UV (365 nm, 2 min) and visible (590 nm, 30 min) light was repeated for up to five times. All cuvettes were covered with the top lids in order to prevent evaporation during the experiments. The results are shown in FIGS. 7 to 12.

As shown in FIGS. 7 to 12, photoswitching was more efficient in PBS than in deionized water for all compounds tested including dendritic nanoclusters according to the present invention. Also, it was confirmed that the fluorescence of the dendritic nanoclusters was switched off when irradiated with UV light and on with visible light. In addition, dendritic nanocluster 1b with a neutral surface exhibited higher on-off contrast upon photoswitching.

Experimental Example 4

Photoswitching Experiments on Living Cells

HeLa cells were seeded in a Lab-Tek II 8-well microscope sample chamber (Nunc) at a density of $1\times10^4$ cells per well. Stock solutions (10 mg/mL in deionized water) of dendritic nanoclusters 1a and 1b were diluted using serum-free DMEM (Gibco) to prepare 10 µg/mL solutions. Cells were washed with PBS three times, treated with 10 µg/mL solutions of dendritic nanocluster 1a or 1b (200 µL per well), and incubated for 30 min at 37° C. under a 5% $CO_2$ atmosphere. The formulations were removed by washing with PBS three times, and the cells were treated with 200 µL of serum-free DMEM. The fluorescence image of living cells was taken using the DeltaVision RT imaging system (Applied Precision) with a filter set of RD-TR-PE ($\lambda_{ex}$ 555 nm, $\lambda_{em}$ 617 nm). Subsequently, the entire area of a selected well containing cells treated as such was irradiated with a UV lamp (365 nm, Spectroline) for 2 min. The fluorescence image of the UV-irradiated living cells was obtained immediately using the DeltaVision RT imaging system. Next, the entire area of the same selected well was irradiated for 30 min with a 590 nm laser beam (Sail Laser) through a magnifier lens. The fluorescence image of the living cells irradiated with a 590 nm light was obtained immediately using the DeltaVision RT imaging system. The entire sequence of the photoswitching experiments using living cells was performed in a darkroom. The results are shown in FIG. 16.

Figure 16:
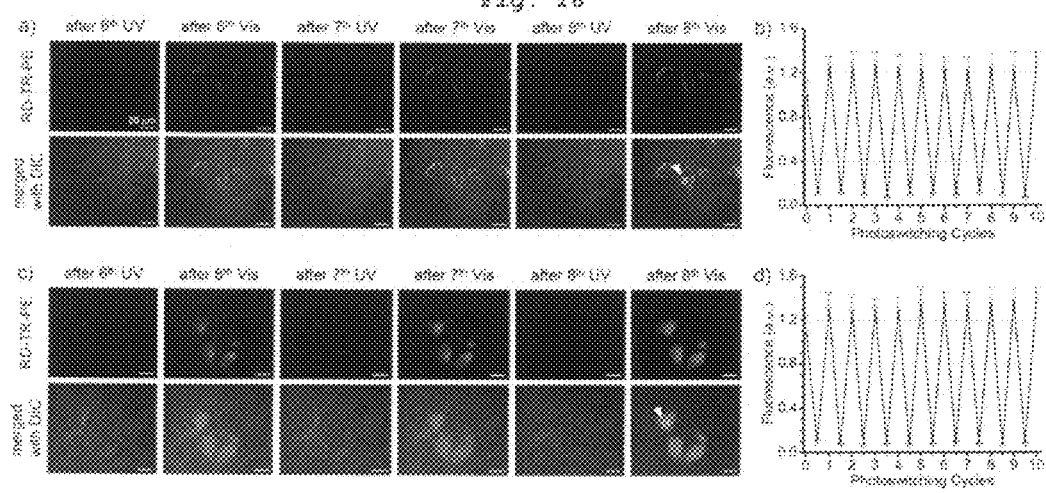
FIG. 16 shows the results of reversible photoswitching experiments performed on living cells with internalized dendritic nanoclusters (a,b) 1a and (c,d) 1b according to one Example of the present invention.
Figure 17:
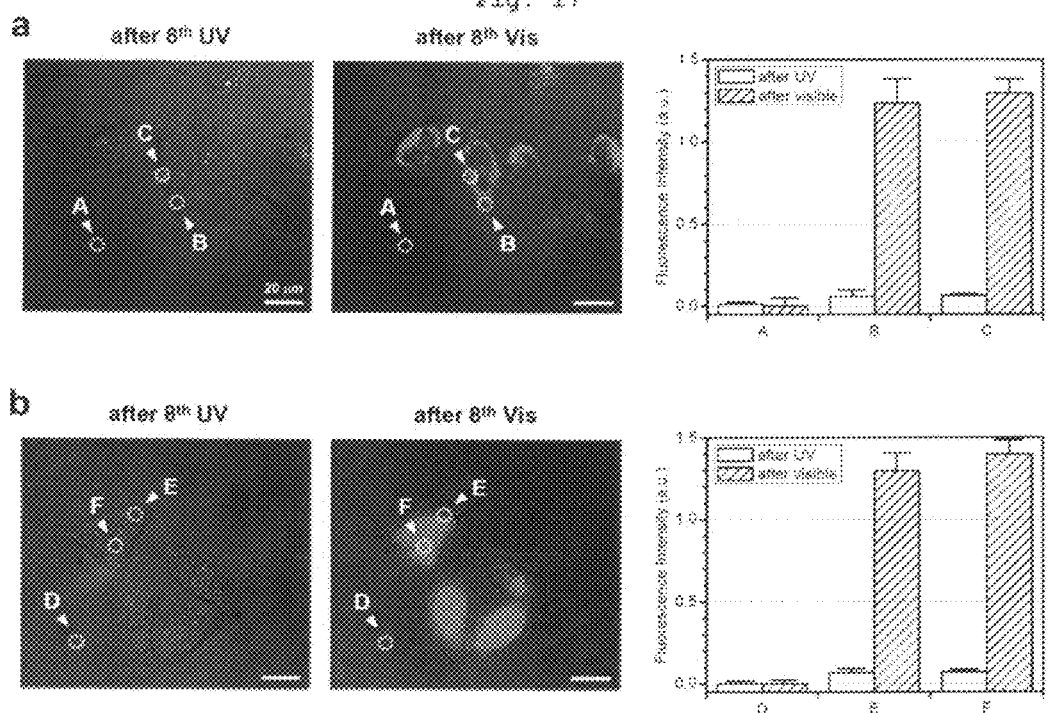
FIG. 17 shows the results of fluorescence intensity measured at selected regions of interest (ROIs) of living HeLa cells incubated with dendritic nanoclusters (a) 1a and (b) 1b during the $8^{th}$ photoswitching cycle, according to one Example of the present invention.

As shown in FIG. 16, both dendritic nanoclusters 1a and 1b according to the present invention were taken up by cells to exhibit fluorescence, and the dendritic nanocluster 1b with a neutral surface exhibited higher on-off contrast in reversible photoswitching of fluorescence than the dendritic nanocluster 1a with an anionic surface.

Experimental Example 5

Photoswitching Experiments on Living Zebrafish

Figure 18:
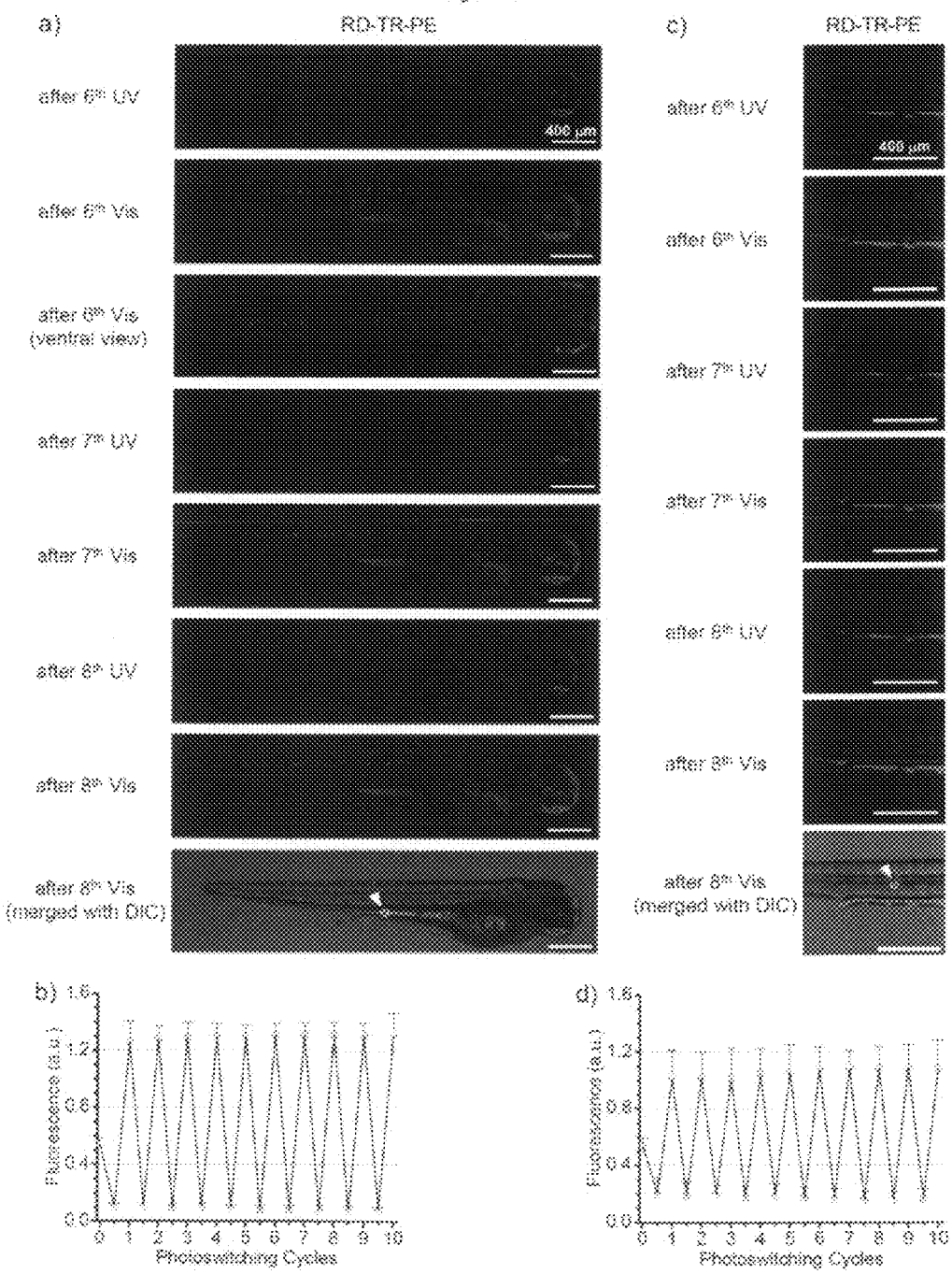
FIG. 18 shows the results of reversible photoswitching experiments performed on living zebrafish with internalized dendritic nanoclusters 1b by (a,b) permeation or (c,d) microinjection, according to one Example of the present invention.

For the uptake of dendritic nanocluster 1b by incubation method, a three-day-old zebrafish was maintained in E3 embryo media (15 mM NaCl, 0.5 mM KCl, 1 mM MgSO$_4$, 1 mM CaCl$_2$, 0.15 mM KH$_2$PO$_4$, 0.05 mM Na$_2$HPO$_4$, 0.7 mM NaHCO$_3$, 10-5% methylene blue; pH 7.5). A stock solution (10 mg/mL) of dendritic nanocluster 1b in deionized water was diluted to 100 μg/mL using E3 media. The zebrafish was placed in a Lab-Tek II 8-well microscope sample chamber (Nunc), treated with 100 μg/mL solution of dendritic nanocluster 1b (200 μL), incubated for 1 h at 28° C., and then washed with E3 media three times. For microinjection of dendritic nanocluster 1b, a two-day-old zebrafish was maintained in saline solution (0.30 g sea salt and 1.0 mL of 0.1% methylene blue solution in deionized water was diluted to a total volume of 1.0 L using deionized water). Ca. 3.2 mL of the stock solution (10 mg/mL) of dendritic nanocluster 1b was injected directly into the heart region of zebrafish under a dissecting microscope using a glass needle attached to the PV820 pneumatic picopump (World Precision Instruments). The zebrafish injected with dendritic nanocluster 1b was washed with saline solution three times, transferred to a Petri dish filled with 10 mL of fresh saline solution, maintained for three additional days, and placed in a Lab-Tek II 8-well microscope sample chamber (Nunc). Next, for zebrafish preparations which were incubated with dendritic nanocluster 1b and microinjected with dendritic nanocluster 1b, the fluorescence image was obtained using the DeltaVision RT imaging system (Applied Precision) with a filter set of RD-TR-PE ($\lambda_{ex}$ 555 nm, $\lambda_{em}$ 617 nm). For zebrafish incubated with dendritic nanocluster 1b, a three-day-old zebrafish was used for photoswitching in E3 media (200 μL) immediately after the treatment without anesthesia. For zebrafish injected with dendritic nanocluster 1b, an anesthetized five-day-old zebrafish was used for photoswitching in 4.2% (v/v) of tricaine (stock: 4.0 g of ethyl 3-aminobenzoate methanesulfonate in 1.0 L of deionized water, pH 7.0) in saline solution (200 μL). The photoswitching experiments on living zebrafish were carried out in the same manner as described in the Experimental Example 4 and the results are shown in FIG. 18.

Experimental Example 6

Fluorescence Microscopy of Sectioned Zebrafish

A four-day-old zebrafish was maintained in E3 embryo media (15 mM NaCl, 0.5 mM KCl, 1 mM MgSO$_4$, 1 mM CaCl$_2$, 0.15 mM KH$_2$PO$_4$, 0.05 mM Na$_2$HPO$_4$, 0.7 mM NaHCO$_3$, $10^{-5}$% methylene blue; pH 7.5). A stock solution (10 mg/mL) of dendritic nanocluster 1b was diluted to 100 μg/mL using E3 media. The zebrafish was placed in a Lab-Tek II 8-well microscope sample chamber (Nunc), treated with 100 μg/mL solution of dendritic nanocluster 1b, and incubated for 1 h at 28° C. The zebrafish was washed three times with PBS and fixed by treating with 4% PFA in PBS for 4 h at room temperature. Next, the zebrafish was washed with PBS three times to remove PFA, treated with 30% sucrose in PBS, left at 4° C. overnight, and washed with PBS again three times to remove the sucrose. A new Lab-Tek II 8-well microscope sample chamber (Nunc) was floated carefully on the liquid nitrogen, one well was filled halfway with Tissue-Tek OCT compound, the fixed zebrafish was added to this well, and then the top void space of the well was filled completely with the OCT compound. Subsequently, the frozen block was removed from the well and cut into 50 μm-thick cryostat sections, which were mounted on microscope slides individually. Sections on slides were air-dried for up to 10 h, treated with 2-3 drops of Universal Mount media (Invitrogen), and coverslipped (24 mm×40 mm, Marienfeld; 24 mm×60 mm, Deckglaser). The sectioned samples were fixed firmly on the slides, and the fluorescence images of sections were taken using the DeltaVision RT imaging system with a filter set of RD-TR-PE ($\lambda_{ex}$ 555 nm, $\lambda_{em}$ 617 nm). The results are shown in FIGS. 19 and 20.

Figure 20:
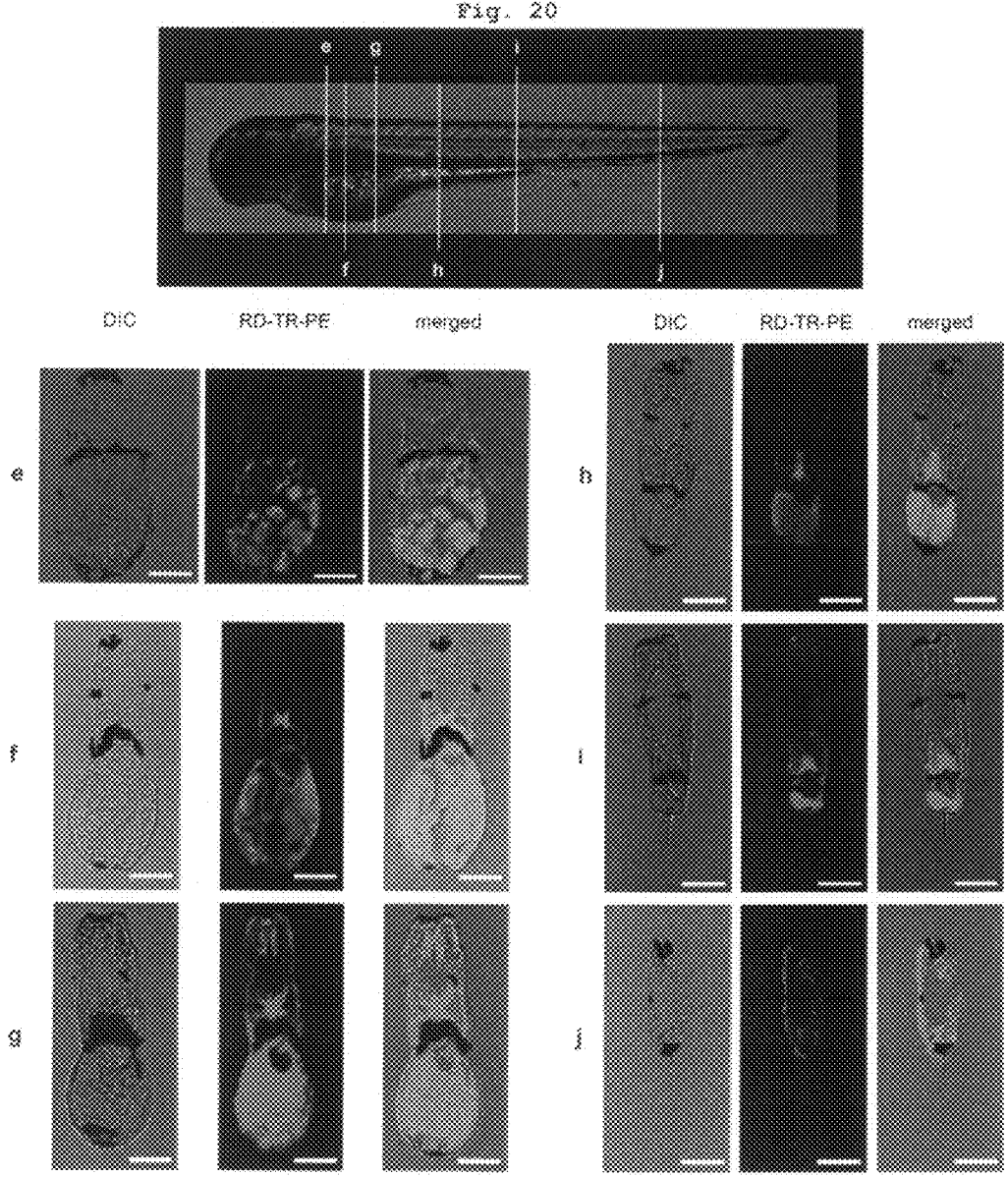
FIG. 20 shows the sectioned fluorescence images of a zebrafish which was incubated with 100 μg/mL of dendritic nanocluster 1b according to one Example of the present invention. Here, the scale bars correspond to 200 μm.

As shown in FIGS. 19 and 20, dendritic nanocluster 1b with a neutral surface was internalized by skin permeation and spread out evenly throughout the entire body of the living zebrafish.

The dendritic nanocluster according to the present invention consists of two or more dendrimers crosslinked each other to have a globular shape overall, and thereby enhancing the fluorescence intensity and improving the detection sensitivity of the monomeric dendrimers. In addition, the dendritic nanocluster according to the present invention was found to internalize into a living zebrafish by both skin permeation and microinjection, independently. Further, the dendritic nanocluster according to the present invention showed low toxicity and thus it could be useful for both in vivo and in vitro imaging as well as the ex vivo cell tracking applications.

What is claimed is:
1. A reversible fluorescence photoswitch based on a dye-crosslinked dendritic nanoclusters for high-contrast imaging of living biological systems, comprising:
   a central dendrimer is surrounded by one or more dendrimers,
      wherein the dendrimers are crosslinked at their periphery to at least one neighboring dendrimer to form a dendritic nanocluster by at least one photochromic compound which can undergo photoswitching, and at least one fluorescent compound is attached to surface of the dendritic nanocluster, wherein distance between the fluorescent compound and at least one neighboring photochromic compound enables fluorescence resonance energy transfer (FRET) for photo switching.

2. The reversible fluorescence photoswitch according to claim 1, wherein the photochromic compound is selected from the group consisting of azobenzene derivatives, spiropyran derivatives, diarylethene derivatives, and fulgide derivatives.

3. The reversible fluorescence photoswitch according to claim 2, wherein the photochromic compound is a diarylethene derivative selected from the group consisting of:

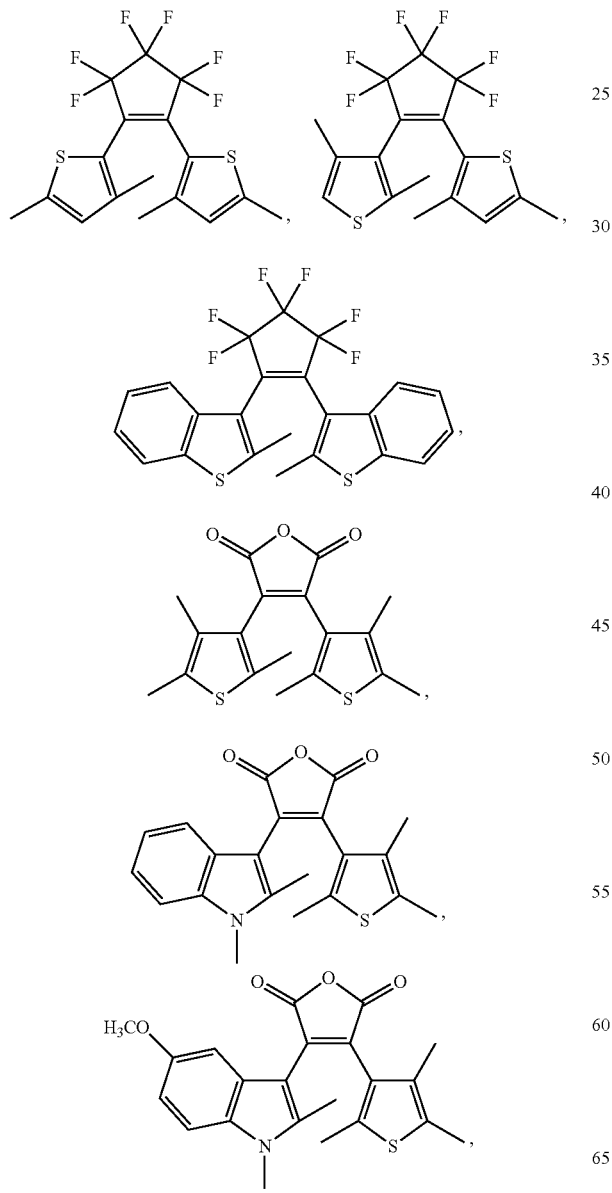

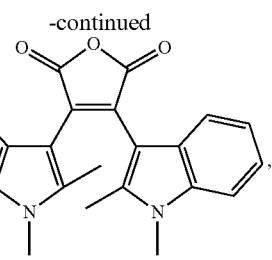

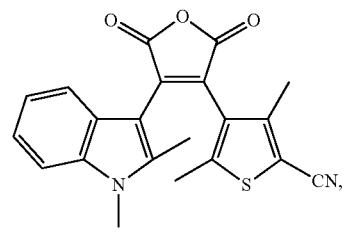

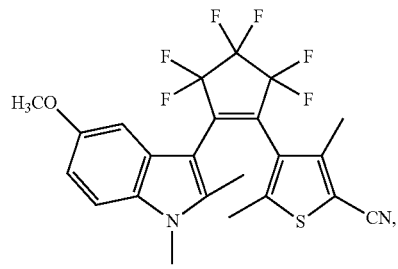

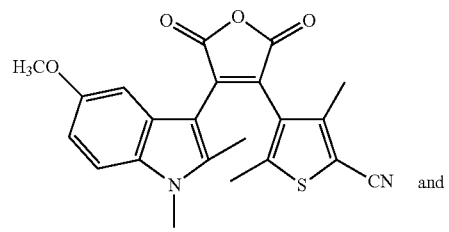 and

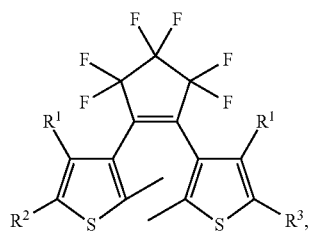

wherein $R^1$ is H or methyl; and $R^2$ and $R^3$ are H, linear or branched $C_1$ to $C_6$ alkyl, or unsubstituted or substituted $C_5$ to $C_7$ aryl or heteroaryl, and $R^2$ and $R^3$ may be identical or different.

4. The reversible fluorescence photoswitch according to claim 3, wherein the diarylethene derivative is represented by the following chemical formula 3a:

[Chemical formula 3a]

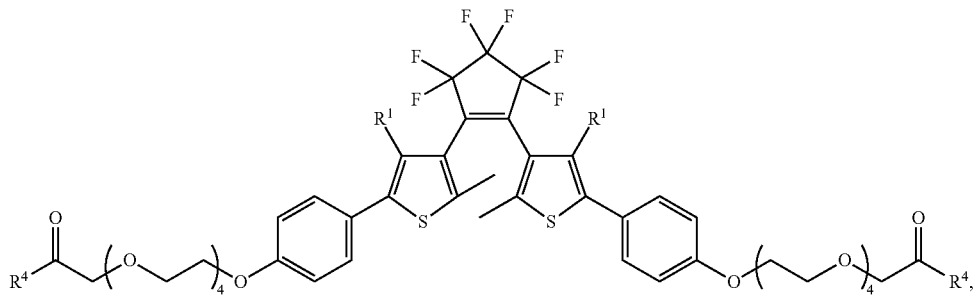

wherein
R¹ is defined in claim 3;
R⁴ is —OR⁵ or —NHR⁵; and
R⁵ is H, linear or branched $C_1$ to $C_6$ alkyl, or unsubstituted or substituted $C_5$ to $C_7$ aryl or heteroaryl.

5. The reversible fluorescence photoswitch according to claim 4, wherein the diarylethene derivative is represented by the following chemical formula 3:

[Chemical formula 3]

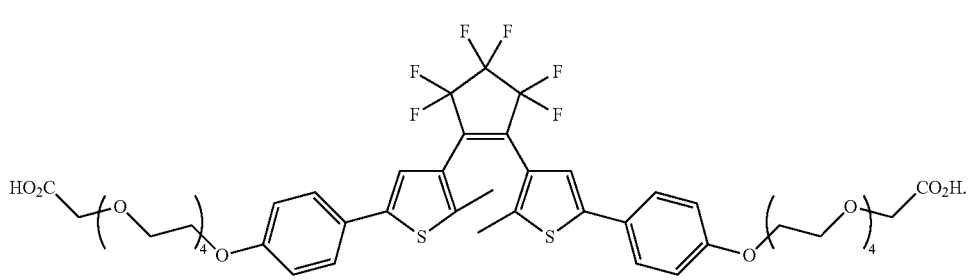

6. The reversible fluorescence photoswitch according to claim 1, wherein the dendrimer is selected from the group consisting of poly(amidoamine) (PAMAM) dendrimer, polylysine dendrimer, poly(propyleneimine) (PPI) dendrimer, polyester dendrimer, poly(glutamic acid) dendrimer, poly(aspartic acid) dendrimer, and polymelamine dendrimer.

7. The reversible fluorescence photoswitch according to claim 6, wherein the dendrimer is fifth generation (G5) PAMAM dendrimer.

8. The reversible fluorescence photoswitch according to claim 7, wherein amino termini of the dendrimer are modified to either anionic or neutral residues in order to conceal the toxic amino groups.

9. The reversible fluorescence photoswitch according to claim 8, wherein the anionic residue is a carboxylate group and the neutral residue is a methoxy poly(ethylene glycol) (mPEG) group or a methoxy oligo(ethylene glycol) (mOEG) group.

10. The reversible fluorescence photoswitch according to claim 1, wherein the fluorescent compound is selected from the group consisting of cyanine (Cy) series, Alexa Fluor series, BODIPY series, DY series, rhodamine derivatives, fluorescein derivatives, and coumarin derivatives.

11. The reversible fluorescence photoswitch according to claim 10, wherein the fluorescent compound is cyanine (Cy) series.

12. The reversible fluorescence photoswitch according to claim 11, wherein the fluorescent compound is Cy3 which is one of the compounds in Cy series.

13. The reversible fluorescence photoswitch according to claim 1, wherein the reversible fluorescence photoswitch is used for multimodal imaging by merging with other diagnostic in vivo imaging methods which can benefit from high-contrast imaging.

14. The reversible fluorescence photoswitch according to claim 13, wherein the other diagnostic in vivo imaging methods are magnetic resonance imaging (MRI), computed tomography (CT), positron emission tomography (PET), or single photon emission computed tomography (SPECT).

* * * * *